US012749715B2

(12) United States Patent
Wu et al.

(10) Patent No.: US 12,749,715 B2
(45) Date of Patent: Sep. 29, 2026

(54) NON-AQUEOUS ELECTROLYTE AND SECONDARY BATTERY, BATTERY MODULE, BATTERY PACK AND ELECTRICAL DEVICE CONTAINING THE SAME

(71) Applicant: CONTEMPORARY AMPEREX TECHNOLOGY (HONG KONG) LIMITED, Hong Kong (CN)

(72) Inventors: Zeli Wu, Ningde (CN); Changlong Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 326 days.

(21) Appl. No.: 18/228,223

(22) Filed: Jul. 31, 2023

(65) Prior Publication Data

US 2023/0378538 A1 Nov. 23, 2023

Related U.S. Application Data

(63) Continuation of application No. PCT/CN2022/094228, filed on May 20, 2022.

(51) Int. Cl.
*H01M 10/0567* (2010.01)
*H01M 4/505* (2010.01)
(Continued)

(52) U.S. Cl.
CPC ....... *H01M 10/0568* (2013.01); *H01M 4/505* (2013.01); *H01M 4/525* (2013.01);
(Continued)

(58) Field of Classification Search
CPC ........... H01M 10/0567–0569; H01M 10/0525; H01M 4/505; H01M 4/525;
(Continued)

(56) References Cited

U.S. PATENT DOCUMENTS

2006/0228624 A1 10/2006 Issaev et al.
2017/0092979 A1* 3/2017 Chiga ................ H01M 10/056
(Continued)

FOREIGN PATENT DOCUMENTS

CA 2872599 A1 11/2013
CN 102569890 A 7/2012
(Continued)

OTHER PUBLICATIONS

Machine Translation JP2015088492A (Year: 2015).*
(Continued)

*Primary Examiner* — Osei K Amponsah
(74) *Attorney, Agent, or Firm* — ANOVA LAW GROUP, PLLC

(57) ABSTRACT

A non-aqueous electrolyte includes an electrolyte salt and a non-aqueous solvent. The electrolyte salt includes a first lithium salt, a second lithium salt, and a third lithium salt, and the content A1 of the first lithium salt, the content A2 of the second lithium salt, and the content A3 of the third lithium salt, based on a total mass of the non-aqueous electrolyte, satisfy that: A1+A2+A3 is below 1%, A1/A2 is from 0.016 to 40, and A1/(A2+A3) is from 0.006 to 13.5.

20 Claims, 2 Drawing Sheets

5

(51) Int. Cl.
*H01M 4/525* (2010.01)
*H01M 10/0568* (2010.01)
*H01M 10/0569* (2010.01)
*H01M 4/02* (2006.01)

(52) U.S. Cl.
CPC ... *H01M 10/0567* (2013.01); *H01M 10/0569* (2013.01); *H01M 2004/021* (2013.01); *H01M 2004/028* (2013.01); *H01M 2220/20* (2013.01); *H01M 2300/004* (2013.01); *H01M 2300/0051* (2013.01)

(58) Field of Classification Search
CPC ..... H01M 2004/021; H01M 2004/028; H01M 2220/20; H01M 2300/004; H01M 2300/0051
See application file for complete search history.

(56) References Cited

U.S. PATENT DOCUMENTS

| | | | | |
|---|---|---|---|---|
| 2018/0301758 | A1 | 10/2018 | Abe et al. | |
| 2020/0243905 | A1* | 7/2020 | Xu | H01M 10/0564 |
| 2021/0119260 | A1 | 4/2021 | Liang et al. | |
| 2022/0140394 | A1* | 5/2022 | He | H01M 50/417 429/332 |

FOREIGN PATENT DOCUMENTS

| | | | | |
|---|---|---|---|---|
| CN | 104282935 | A | 1/2015 | |
| CN | 106663838 | A | 5/2017 | |
| CN | 108987810 | A | 12/2018 | |
| CN | 110176622 | A * | 8/2019 | H01M 10/0567 |
| CN | 108987810 | B | 7/2020 | |
| CN | 111788733 | A | 10/2020 | |
| CN | 114447437 | A | 5/2022 | |
| JP | 2004071159 | A | 3/2004 | |
| JP | 2009158330 | A | 7/2009 | |
| JP | 2010080229 | A | 4/2010 | |
| JP | 2012094454 | A | 5/2012 | |
| JP | 2015088492 | A * | 5/2015 | H01M 10/0567 |
| JP | 2018172266 | A | 11/2018 | |
| WO | 2017015996 | A1 | 2/2017 | |
| WO | 2022246798 | A1 | 12/2022 | |

OTHER PUBLICATIONS

The World Intellectual Property Organization (WIPO) International Search Report for PCT/CN2022/094228 Feb. 20, 2023 5 pages (including English translation).
The European Patent Office (EPO) The Extended European Search Report for Application No. 22924570.9 Apr. 18, 2024 10 Pages.
The Japan Patent Office (JPO) Notice of Reasons for Refusal for Application No. 2023-547404 Oct. 28, 2024 4 Pages (including translation).
State Intellectual Property Office of China The First Office Action for Application No. 202280012714.7 Jul. 3, 2025 17 pages (including translation).

* cited by examiner

NON-AQUEOUS ELECTROLYTE AND SECONDARY BATTERY, BATTERY MODULE, BATTERY PACK AND ELECTRICAL DEVICE CONTAINING THE SAME

CROSS-REFERENCE TO RELATED APPLICATION

This application is a continuation of International Application No. PCT/CN2022/094228, filed on May 20, 2022, the entire content of which is incorporated herein by reference.

TECHNICAL FIELD

The present application belongs to the technical field of battery, in particular to a non-aqueous electrolyte and a secondary battery, a battery module, a battery pack and an electrical device containing the same.

BACKGROUND

In recent years, secondary batteries have been widely used in energy-storage power systems such as hydro, thermal, wind and solar power plants, as well as electric tools, electric bicycles, electric motorcycles, electric vehicles, military equipment, aerospace and many other fields. With the application and promotion of secondary batteries, their comprehensive performance has received more and more attention, for example, secondary batteries need to meet the requirement of high energy density, long cycle life, high safety performance, good multiplier performance and the like at the same time. Non-aqueous electrolyte plays a role of conducting ions between the positive and negative electrodes, and it is one of the key factors affecting the performance of the secondary battery. Therefore, there is an urgent need to provide a non-aqueous electrolyte with good overall performance.

SUMMARY

An object of the present application is to provide a non-aqueous electrolyte and a secondary battery, a battery module, a battery pack and an electrical device containing the same, which enables the secondary battery to simultaneously have good cycle performance, storage performance and kinetic performance.

A first aspect of the present application provides a non-aqueous electrolyte comprising an electrolyte salt as well as a non-aqueous solvent, wherein the electrolyte salt comprises: a first lithium salt having the structure shown in Formula 1, in which $R_1$ represents a fluorine atom or a partially fluorinated or perfluorinated C1-C10 alkyl group, wherein the first lithium salt has a mass content of A1 in the non-aqueous electrolyte, based on the total mass of the non-aqueous electrolyte; a second lithium salt having the structure shown in Formula 2, in which $R_2$ and $R_3$ independently represent at least one of a fluorine atom or a partially fluorinated or perfluorinated group selected from C1-C10 alkyl group, C2-C10 alkenyl group, C2-C10 alkynyl group of, C6-C8 aryl group, C1-C10 alkoxy group, C2-C10 alkenoxy group, C2-C10 alkynloxy group, and C6-C8 aryloxy group, wherein the second lithium salt has a mass content of A2 in the non-aqueous electrolyte, based on the total mass of the non-aqueous electrolyte; a third lithium salt, selected from lithium tetrafluoroborate, wherein the third lithium salt has a mass content of A3 in the non-aqueous electrolyte, based on the total mass of the non-aqueous electrolyte;

Formula 1

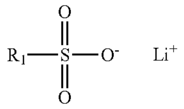

Formula 2

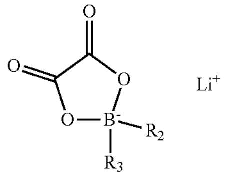

wherein the non-aqueous electrolyte satisfies that: A1+A2+A3 is below 1%, A1/A2 is from 0.016 to 40, and A1/(A2+A3) is from 0.006 to 13.5.

The inventor found through extensive research that by using the first lithium salt, the second lithium salt and the third lithium salt as auxiliary lithium salts in the non-aqueous electrolyte to control their total content below 1%, and reasonably adjusting the content A1 of the first lithium salt, the content A2 of the second lithium salt and the content A3 of the third lithium salt to satisfy that A1/A2 is from 0.016 to 40, and that A1/(A2+A3) is from 0.006 to 13.5, the resulting non-aqueous electrolyte can simultaneously have high thermal stability, high conductivity and wide electrochemical window, and the non-aqueous electrolyte can also passivate the aluminum foil collector and form a dense, stable and low-impedance interfacial film on the surface of the positive active material and the negative active material. Thus the secondary battery using such non-aqueous electrolyte of the present application can have good cycle performance, storage performance and kinetic performance at the same time.

In any embodiment of the present application, A1/A2 is from 0.03 to 10, optionally from 0.1 to 5. This facilitates giving full play to the synergistic effect between the first lithium salt and the second lithium salt, thereby enabling the formation of a denser, more stable and more ion-conductive interfacial film on the surface of the negative active material.

In any embodiment of the present application, A1/(A2+A3) is from 0.02 to 3.5, optionally from 0.1 to 2. This facilitates giving full play to the synergistic effect between the first lithium salt, the second lithium salt and the third lithium salt, thereby enabling the formation of a denser, more stable and more ion-conductive interfacial film on the surface of the positive active material.

In any embodiment of the present application, the non-aqueous electrolyte further satisfies that A3/A2 is from 0.04 to 30, optionally from 1 to 10, thereby facilitating giving full play to the synergistic effect between the second lithium salt and the third lithium salt, which can further improve the cycle performance, storage performance and kinetic performance of the secondary battery.

In any embodiment of the present application, A1 is from 0.005% to 0.2%, optionally from 0.01% to 0.1%.

In any embodiment of the present application, A2 is 0.005% to 0.3%, optionally 0.01% to 0.3%.

In any embodiment of the present application, A3 is 0.01% to 0.5%, optionally 0.02% to 0.2%.

In any embodiment of the present application, the first lithium salt comprises at least one of the following compounds:

H1

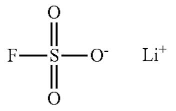

H2

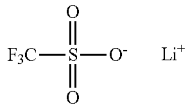

H3

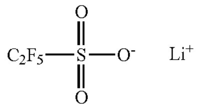

H4

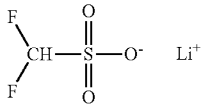

H5

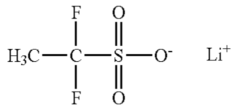

H6

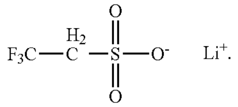

In any embodiment of the present application, the second lithium salt comprises at least one of the following compounds:

H7

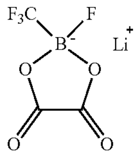

H8

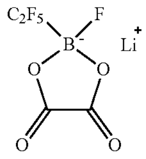

H9

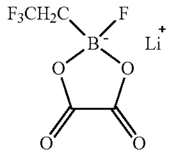

H10

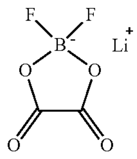

-continued

H11

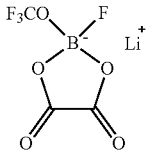

H12

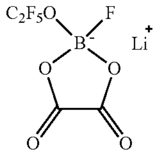

H13

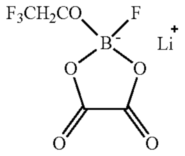

H14

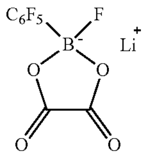

H15

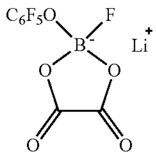

H16

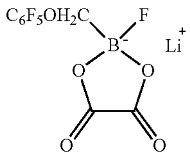

In any embodiment of the present application, the electrolyte salt further comprises at least one of a fourth lithium salt and a fifth lithium salt; wherein the fourth lithium salt is lithium hexafluorophosphate, and wherein the fourth lithium salt has a mass content of A4 in the non-aqueous electrolyte, based on the total mass of the non-aqueous electrolyte; wherein the fifth lithium salt is lithium bis(fluorosulfonyl) imide, and wherein the fifth lithium salt has a mass content of A5 in the non-aqueous electrolyte, based on the total mass of the non-aqueous electrolyte; and wherein the non-aqueous electrolyte satisfies that: A4+A5 is from 10% to 20%, optionally from 10% to 18%.

In any embodiment of the present application, A4/A5 is from 0.2 to 3, more optionally from 0.5 to 1.5. The resulting non-aqueous electrolyte is less prone to hydrolysis and is able to simultaneously combine higher thermal stability and, at the same time, contribute to the formation of a lower impedance interfacial film.

In any embodiment of the present application, (A4+A5)/(A1+A2+A3) is from 10 to 200, optionally from 20 to 120, and more optionally from 40 to 100. This contributes to the non-aqueous electrolyte having simultaneously higher thermal stability, higher ionic conductivity, and a wider electrochemical window, and the non-aqueous electrolyte is able to passivate the aluminum foil collector and form a dense, stable, and low-impedance interfacial film on both the positive and negative active materials. The non-aqueous electrolyte also passivates the aluminum foil collector and forms a dense, stable, low impedance and high ionic conductivity interfacial film on the surface of both the positive and negative active materials.

In any embodiment of the present application, the non-aqueous solvent comprises: a first solvent comprising at least one of ethylene carbonate, propylene carbonate and butylene carbonate, wherein the first solvent has a mass content of B1 in the non-aqueous solvent, based on the total mass of the non-aqueous solvent; a second solvent comprising at least one of methyl ethyl carbonate, diethyl carbonate, dimethyl carbonate, dipropyl carbonate, methyl propyl carbonate and ethyl propyl carbonate, wherein the second solvent has a mass content of B2 in the non-aqueous solvent, based on the total mass of the non-aqueous solvent; and a third solvent comprising at least one of methyl formate, methyl acetate, ethyl acetate, propyl acetate, methyl propionate, ethyl propionate, propyl propionate, methyl butyrate and ethyl butyrate, wherein the third solvent has a mass content of B3 in the non-aqueous solvent, based on the total mass of the non-aqueous solvent; wherein the non-aqueous electrolyte satisfies that: B1 is from 10% to 30%, B2 is from 50% to 90% and B3 is from 0% to 20%.

In any embodiment of the present application, B1/(B2+B3) is from 0.1 to 0.45, more optionally from 0.2 to 0.3. This helps to make the interfacial film formed on the surface of the negative electrode active material more dense and smooth, whereby the growth of dendrites can be effectively inhibited.

In any embodiment of the present application, the non-aqueous electrolyte further comprises: a first additive comprising at least one of v vinylene carbonate, ethylene sulfate, 1,3-propanesultone, which is present in the non-aqueous electrolyte at a mass content of C1, based on the total mass of the non-aqueous electrolyte, wherein C1 is from 0.05% to 2%, optionally from 0.1% to 1%. The first additive helps to further improve the interfacial properties of the positive and/or negative electrodes, thereby further improving at least one of the cycle performance, storage performance and kinetic performance of the secondary battery.

In any embodiment of the present application, the non-aqueous electrolyte further satisfies that (C1+A5)/B1 is from 0.3 to 0.8, optionally from 0.3 to 0.6. This helps to give full play to the synergistic between the above components and to effectively reduce the defects of each component when used alone, resulting in excellent cycle performance of the secondary battery and also avoiding the deterioration of kinetic performance and power performance.

In any embodiment of the present application, the non-aqueous electrolyte further comprises: a second additive comprising at least one of sulfamic acid and a salt thereof, having a mass content of C2 in the non-aqueous electrolyte, based on the total mass of the non-aqueous electrolyte, wherein C2 is from 0.005% to 0.1%, optionally from 0.005% to 0.05%. This helps to improve the cycle performance and kinetic performance of the secondary battery.

A second aspect of the present application provides a secondary battery comprising an electrode assembly, a non-aqueous electrolyte, and an outer package, wherein the non-aqueous electrolyte is the non-aqueous electrolyte according the first aspect of the present application, whereby the secondary battery of the present application can simultaneously have good cycle performance, storage performance, and kinetic performance.

In any embodiment of the present application, the electrode assembly comprises a positive electrode plate having a charge transfer resistance of Rct1 and a negative electrode plate having a charge transfer resistance of Rct2, wherein the positive electrode sheet, and wherein Rct1/Rct2 is from 0.5 to 2, optionally from 1.25 to 2. Thus, the charge transfer resistance of the positive and negative electrodes is less different, which can better improve the performance of the secondary battery.

The charge transfer resistance of the positive electrode plate is obtained by the following method: assembling the positive electrode plate into a symmetrical cell, testing its electrochemical impedance spectrum by using EIS (Electrochemical impedance spectroscopy) via an electrochemical workstation, plotting a Nyquist diagram, analyzing the obtained Nyquist diagram using the equivalent circuit curve fitting method, and taking the semicircle diameter as the charge transfer resistance of the positive electrode plate as Rct1. The charge transfer resistance of the negative electrode plate is obtained by the following method: assembling the negative electrode plate into a symmetrical cell, testing its electrochemical impedance spectrum by using EIS (Electrochemical impedance spectroscopy) via an electrochemical workstation, plotting a Nyquist diagram, analyzing the obtained Nyquist diagram using the equivalent circuit curve fitting method, and taking the semicircle diameter as the charge transfer resistance of the negative electrode plate as Rct2.

In any embodiment of the present application, the non-aqueous electrolyte comprises a first electrolyte infiltrating the electrode assembly and a second electrolyte disposed between the electrode assembly and the outer package, wherein the sum of the mass content of the first lithium salt, the second lithium salt, the third lithium salt, the first additive and the second additive in the first electrolyte is X1, based on the total mass of the first electrolyte; wherein the sum of the mass contents of the first lithium salt, the second lithium salt, the third lithium salt, the first additive and the second additive in the second electrolyte is X2, based on the total mass of the second electrolyte; and $0.5 \leq X1/X2 < 1$. The first electrolyte is obtained by the following test method: disassembling the electrode assembly after discharging the secondary battery to the discharge cut-off voltage and centrifuging it, after which the liquid obtained by centrifugation is the first electrolyte.

In any embodiment of the present application, the positive electrode plate comprises a layered material with a molecular formula of $Li_aNi_bCo_cMn_dAl_eM_fO_gA_h$, in which M represents a cation doped at transition metal site, A represents an anion doped at oxygen site, $0.8 \leq a \leq 1.2$, $0 \leq b \leq 1$, $0 \leq c \leq 1$, $0 \leq d \leq 1$, $0 \leq e \leq 1$, $0 \leq f \leq 0.2$ $0 \leq g \leq 2$, $0 \leq h \leq 2$, $b+c+d+e+f=1$, $g+h=2$.

In some embodiments of the present application, M is selected from at least one of Si, Ti, Mo, V, Ge, Se, Zr, Nb, Ru, Pd, Sb, Ce, Te, and W.

In some embodiments of the present application, A is selected from at least one of F, N, P, and S; optionally, A is selected from F.

In some embodiments of the present application, $0 < b < 0.98$, optionally, $0.50 \leq b < 0.98$.

In some embodiments of the present application, c=0.

In some embodiments of the present application, $0 < c \leq 0.20$, optionally, $0 < c \leq 0.10$.

In some embodiments of the present application, d=0 and $0 < e < 0.50$, optionally, d=0 and $0 < e \leq 0.10$.

In some embodiments of the present application, e=0 and $0 < d < 0.50$, optionally, e=0 and $0 < d \leq 0.10$.

In some embodiments of the present application, $0<d<0.50$ and $0<e<0.50$, optionally, $0<d\leq 0.30$ and $0<e\leq 0.10$.

A third aspect of the present application provides a battery module comprising the secondary battery of the second aspect of the present application.

A fourth aspect of the present application provides a battery pack, comprising one of the secondary battery of the second aspect of the present application and the battery module of the third aspect.

A fifth aspect of the present application provides an electrical device comprising at least one of the secondary battery of the second aspect of the present application, the battery module of the third aspect, and the battery pack of the fourth aspect.

The secondary battery of the present application can simultaneously have good cycle performance, storage performance, and kinetic performance, and the battery module, battery pack, and electrical device of the present application include the secondary battery provided in the present application and thus have at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
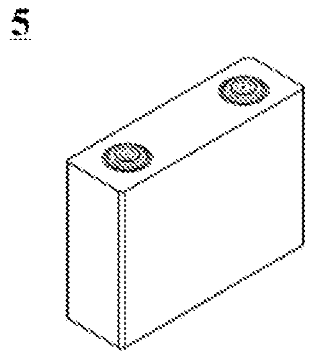
FIG. 1 is a schematic diagram of a secondary battery according to an embodiment of the present application.

In the drawings, the accompanying drawings are not necessarily drawn to actual scale. The reference numerals are defined as follows:

1 battery pack
2 upper case body
3 lower case body
4 battery module
5 battery
51 housing
52 electrode assembly
53 cover plate.

DETAILED DESCRIPTION

Hereinafter, embodiments of the non-aqueous electrolyte, the secondary battery, the battery module, the battery pack, and the electrical device that specifically disclose the present application will be described in detail with reference to the accompanying drawings as appropriate. However, unnecessary detailed descriptions may be omitted in some cases, for example the detailed description of a well-known item or the repetitive description of an actual identical structure so as to prevent the following description from becoming unnecessarily redundant and to facilitate understanding by those skilled in the art. In addition, the drawings and the following description are provided for those skilled in the art to fully understand the present application, and are not intended to limit the subject matter described in the claims.

The "ranges" disclosed in this application are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such a technical solution should be considered to be included in the disclosure of the present application.

Unless stated otherwise, all technical features and optional technical features of the present application can be combined with each other to form a new technical solution, and such a technical solutions should be considered to be included in the disclosure of the present application.

Unless stated otherwise, all steps of the present application can be carried out sequentially, and also can be carried out randomly. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprising" and "including" mentioned in the present application means that it is drafted in an open mode or in a close mode. For example, the transition phases "comprising" and "including" may mean that other components not listed may also be included or contained, or only the listed components may be included or contained.

In the present application herein, unless otherwise stated, the term "or" is inclusive. For example, the phrase "A or B" means A, B, or both A and B". More specifically, either of the following conditions meets "A or B": A is true (or present) and B is false (or absent); A is false (or absent) and B is true (or present); or both A and B are true (or present). In this disclosure, the phrases "at least one of A, B, and C"

and "at least one of A, B, or C" both mean only A, only B, only C, or any combination of A, B, and C.

In the present application, the terms "plurality" and "multiple" refer to two or more.

In the context, the term "alkyl" refers to a saturated hydrocarbon group and includes both straight-chain and branched structures. Examples of alkyl groups include, but are not limited to, methyl, ethyl, propyl (e.g., n-propyl, isopropyl), butyl (e.g., n-butyl, isobutyl, sec-butyl, tert-butyl), pentyl (e.g., n-pentyl, iso-pentyl, neopentyl). In various embodiments, the C1-C10 alkyl group is an alkyl group that may contain from 1 to 10 carbon atoms.

The term "alkenyl" refers to an unsaturated hydrocarbon group containing a carbon-carbon double bond, including both straight-chain and branched structures, and the number of carbon-carbon double bonds may be one or more. Examples of alkenyl groups include, but are not limited to, vinyl, propyl, allyl, and butadienyl. In various embodiments, the C2-C10 alkenyl group is an alkenyl group that may contain from 2 to 10 carbon atoms.

The term "alkynyl" refers to an unsaturated hydrocarbon group containing a carbon-carbon triple bond, including both straight-chain and branched structures, and the number of carbon-carbon triple bonds may be one or more. Examples of alkynyl groups include, but are not limited to, ethynyl groups, propargyl groups, butynyl groups, and butyldiynyl groups. In various embodiments, the C2-C10 alkynyl group is an alkynyl group that may contain from 2 to 10 carbon atoms.

The term "aryl" refers to a carbocyclic system having an aromatic nature, which may be monocyclic, polycyclic or fused ring in structure. Examples of aryl groups include, but are not limited to, phenyl. In various embodiments, the C6-C8 aryl group is an aryl group that may contain from 6 to 8 carbon atoms.

In the context, the term "alkoxy" refers to an alkyl group containing an oxygen atom (—O—); the term "alkenoxy" refers to an alkenyl group containing an oxygen atom (—O—), and the term "alkynyloxy" refers to an alkyl group containing an oxygen atom (—O—); and the term "aryloxy" refers to an alkyl group containing an oxygen atom (—O—).

Throughout the specification, the substituents of the compounds are disclosed in groups or ranges. It is expressly anticipated that such description includes each individual sub-combination of the members of these groups and ranges. For example, it is expressly anticipated that the term "alkyl C1-C6" is separately disclosed for C1, C2, C3, C4, C5, C6, C1-C6, C1-05, C1-C4, C1-C3, C1-C2, C2-C6, C2-05, C2-C4, C2-C3, C3-C6, C3-C6, C3-C5, C3-C4, C4-C6, C4-05, and C5-C6 alkyl groups.

With the application and promotion of secondary batteries, their comprehensive performance is receiving more and more attention. The non-aqueous electrolyte is one of the key factors affecting the performance of secondary batteries, and the most widely commercialized non-aqueous electrolyte system is a mixed carbonate solution of lithium hexafluorophosphate. However, the thermal stability of lithium hexafluorophosphate is poor in high temperature environment, and it will decompose at higher temperature to form LiF and $PF_5$. LiF increases the interfacial impedance; $PF_5$ has strong Lewis acidity, which will interact with the lone pair electrons on the oxygen atom in the solvent molecule and cause the solvent to decompose. In addition, $PF_5$ is highly sensitive to the trace water in the non-aqueous electrolyte, and will generate HF when it meets water, thus increasing the acidity of the non-aqueous electrolyte, which will easily corrode the positive active material and the positive electrode collector and cause the leaching of transition metal ions from the positive active material. In addition, the transition metal ions in the positive active material will be reduced to transition metal after leaching and migrating to the negative electrode, which is equivalent to a "catalyst" and will catalyze the decomposition of solid electrolyte interphase (SEI) on the surface of the negative active material, resulting in by-products. A part of the by-products is gas, thus causing the secondary battery to swell and affecting the safety performance of the secondary battery; another part of the by-products is deposited on the surface of the negative active material, which will obstruct the lithium ion transport channels and cause the secondary battery's impedance to increase, thus affecting the kinetic performance of the secondary battery. Furthermore, in order to replenish the lost interphase, the non-aqueous electrolyte and the active lithium ions inside the battery are continuously consumed, which can bring irreversible effects on the capacity retention of the secondary battery.

Therefore, it is necessary to provide a non-aqueous electrolyte with good overall performance.

The inventors of the present application were surprised to find, after conducting extensive research, that when the non-aqueous electrolyte contains a suitable amount of auxiliary lithium salt, it enables the secondary battery to have good cycle performance, storage performance, and kinetic performance at the same time.

Non-Aqueous Electrolyte

Specifically, a first aspect of the present application provides a non-aqueous electrolyte comprising an electrolyte salt and a non-aqueous solvent.

The electrolyte salt comprises: a first lithium salt having the structure shown in Formula 1, in which $R_1$ represents a fluorine atom or a partially fluorinated or perfluorinated C1-C10 alkyl group, wherein the first lithium salt has a mass content of A1 in the non-aqueous electrolyte, based on the total mass of the non-aqueous electrolyte; a second lithium salt having the structure shown in Formula 2, in which $R_2$ and $R_3$ independently represent at least one of a fluorine atom or a partially fluorinated or perfluorinated group selected from C1-C10 alkyl group, C2-C10 alkenyl group, C2-C10 alkynyl group of, C6-C8 aryl group, C1-C10 alkoxy group, C2-C10 alkenoxy group, C2-C10 alkynloxy group, and C6-C8 aryloxy group, wherein the second lithium salt has a mass content of A2 in the non-aqueous electrolyte, based on the total mass of the non-aqueous electrolyte; a third lithium salt, selected from lithium tetrafluoroborate, wherein the third lithium salt has a mass content of A3 in the non-aqueous electrolyte, based on the total mass of the non-aqueous electrolyte;

Formula 1

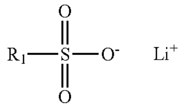

Formula 2

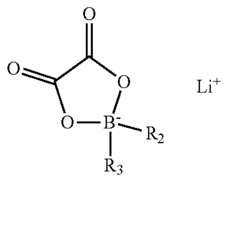

In the present application, the non-aqueous electrolyte satisfies that: A1+A2+A3 is below 1%, A1/A2 is from 0.016 to 40, and A1/(A2+A3) is from 0.006 to 13.5.

The inventors have found through extensive research that by using the first lithium salt, the second lithium salt, and the third lithium salt described above as auxiliary lithium salts in a non-aqueous electrolyte to control their total content below 1%, and by reasonably adjusting the content A1 of the first lithium salt, the content A2 of the second lithium salt, and the content A3 of the third lithium salt to meet A1/A2 of 0.016 to 40, and A1/(A2+A3) of 0.06 to 13.5, the resulting non-aqueous electrolyte can simultaneously have high thermal stability, high ionic conductivity and wide electrochemical window, and the non-aqueous electrolyte can also passivate the aluminum foil collector and form a dense, stable, low impedance and high ionic conductivity interfacial film on the surface of both the positive and negative active materials, so that the secondary battery using the non-aqueous electrolyte of the present application can have good cycle performance, storage performance and kinetic performance at the same time.

Although the mechanism is not clear, the inventors speculate that the possible reasons include the following reasons.

First, by reasonably adjusting the content A1 of the first lithium salt and the content A2 of the second lithium salt to meet A1/A2 of 0.016 to 40, it helps to form a dense, stable and highly ion-conductive interfacial film on the surface of the negative active material. The first lithium salt contains sulfonic acid anion, which can be reduced to form highly conductive ionic compounds such as $Li_2SO_4$, thus helping to improve the ion transport characteristics of the interfacial film on negative electrode; the molecular structure of the second lithium salt contains an oxalate group, whose reduction products can further react with organic components such as $(LiOCO_2CH_2)_2$ in the interfacial film to form complex and stable oligomers, which can fully cover the surface of the negative active material and prevent the non-aqueous electrolyte from directly contacting with the negative active material, and reduce the embedding of non-aqueous solvent into the negative active material. When A1/A2 is greater than 40, the interface film on negative electrode cannot adequately cover the surface of the negative active material, thereby increasing the irreversible consumption of lithium ions and reducing the capacity retention of the secondary battery; when A1/A2 is less than 0.016, the ion transport characteristics of the interface film on negative electrode are poor, leading to an increase in the internal resistance of the secondary battery and a deterioration in the kinetic performance.

Second, by reasonably adjusting the content A1 of the first lithium salt, the content A2 of the second lithium salt, and the content A3 of the third lithium salt to meet A1/(A2+A3) of 0.006 to 13.5, it helps to form a dense, stable interfacial film containing a small amount of LiF on the surface of the positive active material, which increases the lithium ion transport channels of the interfacial film on positive electrode and reduces the lithium ion transport resistance. At the same time, the irreversible phase change of the positive active material is suppressed, and the structural stability of the positive active material is maintained, resulting in better capacity performance of the secondary battery. In addition, the B atom in the molecular structure of the second lithium salt can easily combine with the O atom in the positive active material, thus reducing the charge transfer impedance of the positive active material and lowering the diffusion resistance of lithium ions in the bulk phase of the positive active material. When A1/(A2+A3) is greater than 13.5, the second lithium salt and the third lithium salt cannot effectively compensate for the deterioration of the internal resistance of the first lithium salt, resulting in poor kinetic performance of the secondary battery, while the interface film on positive electrode cannot adequately cover the surface of the positive active material, thus increasing the irreversible consumption of lithium ions and reducing the capacity retention of the secondary battery; when A1/(A2+A3) is less than 0.006, the LiF content in the interface film on positive electrode is too much, which increases the interface impedance of the positive electrode and affects the kinetic performance of the secondary battery.

Third, the first lithium salt can form an interfacial film not only at the negative electrode, but also at the positive electrode, thereby improving the capacity and kinetic performance of the secondary battery. However, the fluorosulfonyl group in the first lithium salt tends to corrode the aluminum foil collector and affect the performance of the secondary battery, such as increasing battery polarization and irreversible capacity loss, and even affecting the safety performance of the secondary battery. It is mainly manifested in the following aspects: some solid insoluble corrosion products will increase the internal resistance of the secondary battery; some soluble corrosion products will pollute and intensify the decomposition of the non-aqueous electrolyte and increase the self-discharge of the secondary battery. $Al^{3+}$ generated during the corrosion process may migrate to the negative electrode by diffusion and be reduced to aluminum dendrites. The B—O bond in the molecular structure of the second lithium salt can bond with $Al^{3+}$ to form a passivation film on the surface of the aluminum foil collector, and in some embodiments the third lithium salt can be decomposed by oxidation and form a passivation film on the surface of the aluminum foil collector; therefore, the non-aqueous electrolyte of the present application can passivate the aluminum foil collector, effectively improve the corrosion of the first lithium salt on the aluminum foil collector, and reduce the irreversible capacity loss of the secondary battery.

Thus, the reason why the secondary battery using the non-aqueous electrolyte of the present application can simultaneously have good cycle performance, storage performance and kinetic performance may lie in the synergistic effect formed between the above components. The first lithium salt forms an interfacial film at both positive electrode and negative electrode, and the ionic conductivity of the non-aqueous electrolyte is improved by the synergistic effect between the second lithium salt, the third lithium salt and the first lithium salt, thus compensating for the defects of the first lithium salt, such as small dissociation degree, low ionic conductivity and the like. The first lithium salt, the second lithium salt and the third lithium salt synergistically form a dense, stable interfacial film containing a small amount of LiF on the surface of the negative active material. As a result, the interfacial side reaction between the non-aqueous electrolyte and the electrode is reduced, the irreversible consumption of active lithium ions is reduced, the capacity of the secondary battery is increased and the gas production is reduced; in addition, the interfacial film formed on the surface of the positive active material and the negative active material has low impedance and high ionic conductivity, and the internal resistance of the secondary battery is reduced.

In some embodiments, A1/A2 may be from 0.03 to 40, from 0.03 to 30, from 0.03 to 20, from 0.03 to 15, from 0.03 to 10, from 0.03 to 8, from 0.03 to 6, from 0.05 to 40, from 0.05 to 30, from 0.05 to 20, from 0.05 to 15, from 0.05 to 10, from 0.05 to 8, from 0.05 to 6, from 0.05 to 5, from 0.1 to 40, from 0.1 to 30, from 0.1 to 20, from 0.1 to 15, from 0.1 to 10, from 0.1 to 8, from 0.1 to 6, from 0.1 to 5, from 0.2 to 40, from 0.2 to 30, from 0.2 to 20, from 0.2 to 15, from 0.2 to 10, from 0.2 to 8, from 0.2 to 6, from 0.2 to 5, or from 0.2 to 2.5. A1/A2 within a suitable range, can facilitates to give full play to the synergistic effect between the first lithium salt and the second lithium salt, thereby enabling the formation of a denser, more stable and more ion-conductive interfacial film on the surface of the negative active material.

In some embodiments, A1/(A2+A3) may be from 0.01 to 13.5, from 0.01 to 10, from 0.01 to 8, from 0.01 to 6, from 0.01 to 5, from 0.01 to 4, from 0.01 to 3.5, from 0.01 to 3, from 0.01 to 2.5, from 0.01 to 2, from 0.02 to 13.5, from 0.02 to 10, from 0.02 to 8, from 0.02 to 6, from 0.02 to 5, from 0.02 to 4, from 0.02 to 3.5, from 0.02 to 3, from 0.02 to 2.5, from 0.02 to 2, from 0.1 to 13.5, from 0.1 to 10, from 0.1 to 8, from 0.1 to 6, from 0.1 to 5, from 0.1 to 4, from 0.1 to 3.5, from 0.1 to 3, from 0.1 to 2.5, from 0.1 to 2 or from 0.1 to 1. When A1/(A2+A3) is within a suitable range, the synergistic effect between the first lithium salt, the second lithium salt and the third lithium salt can be fully utilized, thereby enabling the formation of a denser, more stable and more ion-conductive interfacial film on the surface of the positive active material.

Since the second lithium salt contains an oxalate group in its molecular structure, its thermal stability is lower than that of the third lithium salt, and it will be oxidized to form carbon dioxide gas when heated, so its higher content may reduce the thermal stability of the non-aqueous electrolyte and increase the gas production of the secondary battery. Since the ionic radius of BFI is small and easy to associate, the ionic conductivity of the non-aqueous electrolyte may be reduced when the content of the third lithium salt is higher. The inventors further discovered through extensive research that when the content of the second lithium salt A2 and the content of the third lithium salt A3 are reasonably adjusted to meet the A3/A2 of 0.04 to 30, the non-aqueous electrolyte can have both high thermal stability and high ionic conductivity, which can not only form a low impedance and high ionic conductivity interfacial film at both the positive and negative electrodes, but also better protect the aluminum foil collector, thus further improve the cycle performance, storage performance and kinetic performance of the secondary battery. When A3/A2 is greater than 30, the second lithium salt has a weak effect on the reduction of the interfacial impedance of the negative electrode, which may not be sufficient to compensate for the deterioration of the kinetic performance of the secondary battery by the third lithium salt; when A3/A2 is less than 0.04, a higher amount of the second lithium salt may lead to a decrease in the thermal stability of the non-aqueous electrolyte and a deterioration in the storage performance of the secondary battery.

In some embodiments, optionally, A3/A2 is from 0.1 to 30, from 0.1 to 25, from 0.1 to 20, from 0.1 to 18, from 0.1 to 15, from 0.1 to 13.5, from 0.1 to 12, from 0.1 to 11, from 0.1 to 10, from 0.1 to 9, from 0.1 to 8, from 0.1 to 7, from 0.1 to 6, from 0.1 to 5, from 0.5 to 30, from 0.5 to 25, from 0.5 to 20, from 0.5 to 18, from 0.5 to 15, from 0.5 to 13.5, from 0.5 to 12, from 0.5 to 11, from 0.5 to 10, from 0.5 to 9, from 0.5 to 8, from 0.5 to 7, from 0.5 to 6, from 0.5 to 5, from 1 to 30, from 1 to 25, from 1 to 20, from 1 to 18, from 1 to 15, from 1 to 13.5, from 1 to 12, from 1 to 11, from 1 to 10, from 1 to 9, from 1 to 8, from 1 to 7, from 1 to 6, or from 1 to 5. A3/A2 within a suitable range is conducive to giving full play to the synergistic effect between the second lithium salt and the third lithium salt, thereby enabling further improvement of the cycle performance, storage performance, and kinetic performance of the secondary battery.

The first lithium salt tends to form a associated ion pair in a non-aqueous solvent, reducing the ionic conductivity of the non-aqueous electrolyte. In some embodiments, A1 is from 0.005% to 0.2%. Optionally, A1 is from 0.005% to 0.18%, from 0.005% to 0.16%, from 0.005% to 0.14%, from 0.005% to 0.12%, from 0.005% to 0.1%, from 0.005% to 0.08%, from 0.008% to 0.18%, from 0.008% to 0.16%, from 0.008% to 0.14%, from 0.008% to 0.12%, from 0.008% to 0.1%, from 0.008% to 0.08%, from 0.01% to 0.18%, from 0.01% to 0.16%, from 0.01% to 0.14%, from 0.01% to 0.12%, from 0.01% to 0.1%, or from 0.01% to 0.08%.

In the molecular structure the second lithium salt contains an oxalate group that is oxidized when subjected to heat to form carbon dioxide gas, reducing the thermal stability of the non-aqueous electrolyte. In some embodiments, A2 is from 0.005% to 0.3%. Optionally, A2 is from 0.01% to 0.3%, from 0.01% to 0.26%, from 0.01% to 0.22%, from 0.01% to 0.2%, from 0.01% to 0.18%, from 0.01% to 0.16%, from 0.01% to 0.14%, from 0.01% to 0.12%, from 0.01% to 0.1%, from 0.02% to 0.3%, from 0.02% to 0.26%, from 0.02% to 0.22%, from 0.02% to 0.2%, from 0.02% to 0.18%, from 0.02% to 0.16%, from 0.02% to 0.14%, from 0.02% to 0.12%, from 0.02% to 0.1%, from 0.05% to 0.3%, from 0.05% to 0.26%, from 0.05% to 0.22%, from 0.05% to 0.2%, from 0.05% to 0.18%, from 0.05% to 0.16%, from 0.05% to 0.14%, from 0.05% to 0.12%, or from 0.05% to 0.1%.

When the content of the third lithium salt increases, the ionic conductivity of the non-aqueous electrolyte decreases, which is not conducive to the formation of a stable interfacial film on the surface of the negative active material. In some embodiments, A3 is from 0.01% to 0.5%. Optionally, A3 may be from 0.01% to 0.45%, from 0.01% to 0.4%, from 0.01% to 0.35%, from 0.01% to 0.3%, from 0.01% to 0.25%, from 0.01% to 0.2%, from 0.01% to 0.15%, from 0.01% to 0.1%, from 0.02% to 0.45%, from 0.02% to 0.4%, from 0.02% to 0.35%, from 0.02% to 0.3%, from 0.02% to 0.25%, from 0.02% to 0.2%, from 0.02% to 0.15%, or from 0.02% to 0.1%.

In some embodiments, $R_1$ represents a fluorine atom or a partially fluorinated or perfluorinated C1-C6 alkyl group. Optionally, $R_1$ represents a fluorine atom or a partially fluorinated or perfluorinated methyl, ethyl, or propyl. More optionally, $R_1$ represents a fluorine atom, a trifluoromethyl, a difluoromethyl, or a monofluoromethyl.

As an example, the first lithium salt comprises at least one of the following compounds:

H1

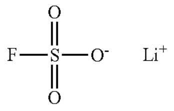

H2

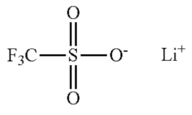

H3

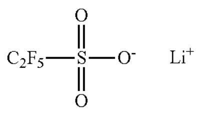

-continued

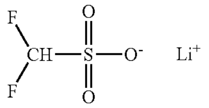
H4

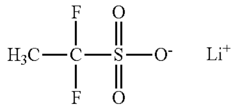
H5

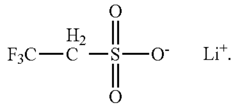
H6

Each of $R_2$ and $R_3$ represent a fluorine atom or a fluorine-containing group, the presence of the fluorine atom or fluorine-containing group contributing to the formation of a thinner positive interface film and/or negative interface film, thereby contributing to uniform lithium ion transport and also effectively inhibiting formation of lithium dendrite. In some embodiments, $R_2$ and $R_3$ independently represent a fluorine atom or at least one of a partially fluorinated or perfluorinated group selected from C1-C10 alkyl group, C2-C10 alkenyl group, C2-C10 alkynyl group of, C6-C8 aryl group, C1-C10 alkoxy group, C2-C10 alkenoxy group, C2-C10 alkynloxy group, and C6-C8 aryloxy group, respectively. Optionally, $R_2$ and $R_3$ independently represent a fluorine atom or at least one of a partially fluorinated or perfluorinated group selected from methyl, ethyl, propyl, phenyl, methoxy, ethoxy, propoxy, phenoxy, respectively. More optionally, both $R_2$ and $R_3$ represent a fluorine atom.

As an example, the second lithium salt comprises at least one of the following compounds:

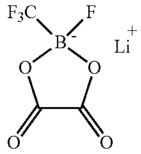
H7

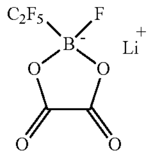
H8

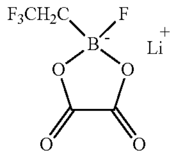
H9

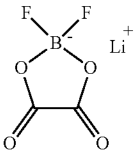
H10

-continued

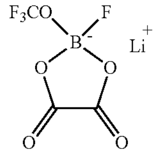
H11

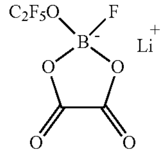
H12

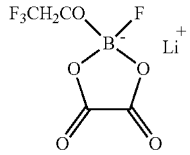
H13

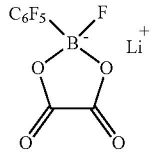
H14

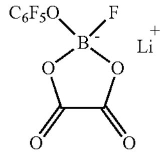
H15

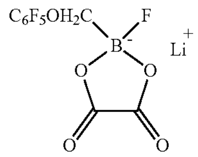
H16

In some embodiments, the electrolyte salt further comprises at least one of a fourth lithium salt and a fifth lithium salt. The fourth lithium salt is lithium hexafluorophosphate, which has a mass content of A4 in the non-aqueous electrolyte, based on the total mass of the non-aqueous electrolyte; the fifth lithium salt is lithium bis(fluorosulfonyl)imide, which has a mass content of A5 in the non-aqueous electrolyte, based on the total mass of the non-aqueous electrolyte, wherein the non-aqueous electrolyte satisfies that: A4+A5 is from 10% to 20%, optionally from 10% to 18%, from 10% to 17%, from 10% to 16%, from 10% to 15%, from 12% to 18%, from 12% to 17%, from 12% to 16% or 12% to 15%.

The non-aqueous electrolyte according to the present application uses lithium hexafluorophosphate and/or lithium bis(fluorosulfonyl)imide as the primary lithium salt. Lithium hexafluorophosphate, which has high ionic conductivity and is less likely to corrode the aluminum foil collector, can improve the overall ionic conductivity and thermal stability of the non-aqueous electrolyte as the primary lithium salt. The chemical formula of lithium bis(fluorosulfonyl)imide is $F_2NO_4S_2 \cdot Li$. The N atom is connected with two electron-absorbing sulfonyl groups, which makes the charge on the N atom fully dissociated, and thus lithium bis(fluorosulfonyl)imide has low lattice energy and can dissociate easily, which can improve the ionic conductivity and reduce the viscosity of non-aqueous electrolyte. In addition, lithium bis(fluorosulfonylimine) has good heat resistance and is not easily hydrolyzed, which can form a thinner, lower impedance and more thermally stable interfacial film on the surface of the negative active material, thus reducing the side reaction between the negative active material and the non-aqueous electrolyte.

In some embodiments, the non-aqueous electrolyte comprises lithium hexafluorophosphate as the primary lithium salt, i.e., A5 is 0%, and A4 is from 10% to 20%, and optionally from 10% to 18%, from 10% to 17%, from 10% to 16%, from 10% to 15%, from 12% to 18%, from 12% to 17%, from 12% to 16%, or from 12% to 15%.

In some embodiments, the non-aqueous electrolyte comprises lithium bis(fluorosulfonyl)imide as the primary lithium salt, i.e. A4 is 0%, and A5 is from 10% to 20%, and optionally from 10% to 18%, from 10% to 17%, from 10% to 16%, from 10% to 15%, from 12% to 18%, from 12% to 17%, from 12% to 16%, or from 12% to 15%.

In some embodiments, the electrolyte salt may comprise both a fourth lithium salt and a fifth lithium salt. Optionally, A4/A5 is from 0.2 to 3, more optionally from 0.3 to 2, from 0.4 to 1.8 or from 0.5 to 1.5. Thus the non-aqueous electrolyte is less prone to hydrolysis and is able to simultaneously have higher thermal stability and, at the same time, contribute to the formation of a lower impedance interfacial film.

In some embodiments, the non-aqueous electrolyte satisfies that: (A4+A5)/(A1+A2+A3) is from 10 to 200. Optionally, (A4+A5)/(A1+A2+A3) is from 15 to 250, from 20 to 120, from 40 to 100, or from 40 to 80. The mass ratio of the primary lithium salt to the secondary lithium salt is in a suitable range, which contributes to the high thermal stability, high ionic conductivity and wide electrochemical window of the non-aqueous electrolyte at the same time, and the non-aqueous electrolyte is also able to passivate the aluminum foil collector and form a dense, stable, low impedance and high ionic conductivity interfacial film on the surface of both the positive and negative active materials.

In some embodiments, the non-aqueous electrolyte may further comprise other electrolyte salts, including, for example, at least one of lithium perchlorate ($LiClO_4$), lithium hexafluoroarsenate ($LiAsF_6$), lithium difluorophosphate ($LiPO_2F_2$), lithium difluorodioxalate phosphate (LiDFOP), and lithium tetrafluoroxalate phosphate (LiTFOP). These other electrolyte salts may serve as auxiliary lithium salts that serve to further improve the interfacial properties of the positive and/or negative electrodes, or to improve the ionic conductivity or thermal stability of the non-aqueous electrolyte. Optionally, the total mass content of these other electrolyte salts in the non-aqueous electrolyte is below 1%, and more optionally below 0.5%, based on the total mass of the non-aqueous electrolyte.

In some embodiments, the non-aqueous solvent may comprise at least one of a first solvent, a second solvent, and a third solvent.

The first solvent is a cyclic carbonate compound, which may comprise, for example, at least one of ethylene carbonate (EC), propylene carbonate (PC), and butylene carbonate (BC). Optionally, the first solvent comprises ethylene carbonate.

The second solvent is a chain carbonate compound, which may comprise, for example, at least one of methyl ethyl carbonate (EMC), diethyl carbonate (DEC), dimethyl carbonate (DMC), dipropyl carbonate (DPC), methyl propyl carbonate (MPC), ethyl propyl carbonate (EPC). Optionally, the second solvent comprises at least one of methyl ethyl carbonate (EMC), diethyl carbonate (DEC), and dimethyl carbonate (DMC). More optionally, the second solvent comprises methyl ethyl carbonate (EMC), diethyl carbonate (DEC), or a combination thereof.

In some embodiments, the non-aqueous solvent comprises at least a first solvent and a second solvent. If the content of the electrolyte salt is too high, the viscosity of the non-aqueous electrolyte will increase and the conductivity of the non-aqueous electrolyte will decrease, which is not conducive to the formation of a uniform, dense, stable and low-impedance interfacial film. While the first solvent can increase the conductivity of the non-aqueous electrolyte due to its high dielectric constant; the second solvent can reduce the viscosity of the non-aqueous electrolyte due to its low viscosity. Thus, when the non-aqueous solvent comprises both the first solvent and the second solvent, it helps the non-aqueous electrolyte to have a suitable viscosity and conductivity, which in turn facilitates lithium ion transport.

In some embodiments, the non-aqueous solvent may further comprise a third solvent. The third solvent is a carboxylic ester compound, which may comprise, for example, at least one of methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB). The third solvent has the advantages of low viscosity and high dielectric constant, and its application in non-aqueous electrolytes helps non-aqueous electrolytes to have suitable viscosity and ionic conductivity, which in turn facilitates the transport of lithium ions.

In some embodiments, the first solvent has a mass content of B1 in the non-aqueous solvent, the second solvent has a mass content of B2 in the non-aqueous solvent, and the third solvent has a mass content of B3 in the non-aqueous solvent, all based on the total mass of the non-aqueous solvent, and the non-aqueous solvent satisfies that: B1 is from 10% to 30%, B2 is from 50% to 90%, and B3 is from 0% to 20%.

The third solvent is less resistant to oxidation and is prone to oxidative decomposition when stored in a highly charged state, and therefore its content should not be excessively high. In some embodiments, B3 is 0%. In some embodiments, B3 is from 2% to 20%, optionally from 5% to 10%.

In some embodiments, B1/(B2+B3) is from 0.1 to 0.45, optionally from 0.2 to 0.3. When the non-aqueous solvent contains a suitable amount of the first solvent, in particular, when it contains a suitable amount of ethylene carbonate, the free radical formed by the decomposition of the second lithium salt can induce ring opening and polymerization of ethylene carbonate, so that the interfacial film formed on the surface of the negative active material is more dense and smooth.

The non-aqueous solvent of the present application may further comprise other solvents other than the first solvent, the second solvent, and the third solvent described above. As examples, the other solvents may include sulfone solvents, such as sulfolane (SF), methyl sulfonyl methane (MSM), ethyl methyl sulfone (EMS), and ethyl sulfonyl ethane (ESE).

In some embodiments, the non-aqueous electrolyte further comprises: a first additive comprising at least one of fluoroethylene carbonate (FEC), vinylene carbonate (VC), ethylene sulfate (DTD), and 1,3-propanesulfonate (PS) in the non-aqueous electrolyte at a mass content of C1, based on the total mass of the non-aqueous electrolyte, C1 being from 0.05% to 2%. Optionally, C1 is from 0.1% to 2%, from 0.1% to 1.5%, from 0.1% to 1.2%, from 0.1% to 1%, from 0.1% to 0.8%, from 0.1% to 0.6% or from 0.1% to 0.5%. The first additive helps to further improve the interface performance of the positive and/or negative electrodes, thereby further improving at least one of the cycle performance, storage performance, and kinetic performance of the secondary battery.

In some embodiments, the non-aqueous electrolyte further comprises: a first additive comprising at least one of vinylene carbonate (VC), ethylene sulfate (DTD), and 1,3-propanesultone (PS) in the non-aqueous electrolyte at a mass content of C1, based on the total mass of the non-aqueous electrolyte, and the content C1 of the first additive, the content A5 of lithium bis(fluorosulfonyl)imide, and the content B1 of the first solvent satisfy that: (C1+A5)/B1 is from 0.3 to 0.8, optionally from 0.3 to 0.5. The first additive helps to form a film on the surfaces of positive and negative electrode to reduce ongoing side reactions, thereby improving at least one of the cycle performance, storage performance, and kinetic performance of the secondary battery. However, when the content of the first additive is higher, the interfacial impedance of positive electrode and/or the interfacial impedance of negative electrode increases, which affects the power performance of the secondary battery. Lithium bis(fluorosulfonyl)imide can improve the ionic conductivity and thermal stability of the non-aqueous electrolyte and reduce the interfacial impedance of positive electrode and/or the interfacial impedance of negative electrode, but it is corrosive to the aluminum foil collector, and its higher content affects the cycle performance of the secondary battery. The first solvent has a high dielectric constant, which helps the dissociation of lithium salt, so it can improve the ionic conductivity of the non-aqueous electrolyte to a certain extent, but when the content of the first solvent is high, the viscosity of the non-aqueous electrolyte will increase on the one hand, and the thermal stability of the non-aqueous electrolyte will be affected on the other hand, which will affect the storage performance of the secondary battery. In further research, the inventors found that by controlling (C1+A5)/B1 between 0.3 and 0.8, it helps to give full play to the synergistic effect between the above components and effectively reduce the defects of each component when used alone, thereby enabling the secondary battery to have excellent cycle performance and also avoiding deterioration of kinetic performance and power performance.

In some embodiments, the non-aqueous electrolyte further comprises: a second additive comprising at least one of sulfamic acid and a salt thereof. The molecular formula of the sulfamic acid is $H_3NO_3S$, and the sulfamic acid salt (sulfamate) includes at least one of an ammonium salt, an alkali metal salt, an alkaline earth metal salt, an alkaline earth metal-like salt, and as an example, the sulfamic acid salt may include at least one of ammonium sulfamate, lithium sulfamate, sodium sulfamate, and zinc sulfamate. Optionally, the second additive comprises sulfamic acid, lithium sulfamate, or a combination thereof.

Sulfamic acid, which is more acidic and is commonly used in the preparation of lithium bis(fluorosulfonyl)imide, has not been found to be applicable in non-aqueous electrolytes. The inventors of the present application were surprised to find in further research that when the non-aqueous electrolyte of the present application containing the above the above auxiliary lithium salts (the first lithium salt, the second lithium salt and the third lithium salt) further comprises an appropriate amount of sulfamic acid and the salt thereof, it helps to improve the cycle performance and kinetic performance of the secondary battery. Although the mechanism is still unclear, the inventors speculate that the possible reason is that sulfamic acid and the salt thereof help to improve the ionic conductivity and reduce the viscosity of the non-aqueous electrolyte, and at the same time, they can also play a role in slowly dissolving lithium dendrites and other metals to a certain extent, thus reducing the lithium monomers, aluminum monomers and transition metal monomers deposited on the surface of the negative active material, and thus the secondary battery can have improved cycle performance and kinetic performance.

Sulfamic acid and the salt thereof are soluble in water and highly acidic, which when present in high levels can corrode the positive active material and destabilize the positive and/or negative interfacial films. In some embodiments, the second additive has a mass content of C2 in the non-aqueous electrolyte, optionally from 0.005% to 0.1%, more optionally from 0.005% to 0.05%, based on the total mass of the non-aqueous electrolyte.

In some embodiments, the non-aqueous electrolyte may further comprise both the first additive and the second additive as described above.

The non-aqueous electrolyte of the present application can be prepared according to methods conventional in the art. For example, the additive, the non-aqueous solvent, the electrolyte salt, etc. can be mixed well to obtain a non-aqueous electrolyte. The order of addition of each material is not particularly limited; for example, the additive, the electrolyte salt, and the like can be added to the non-aqueous solvent and mixed well to obtain the non-aqueous electrolyte.

In the present application, the components of the non-aqueous electrolyte and the contents thereof can be determined according to methods known in the art. For example, they can be determined by gas chromatography-mass spectrometry (GC-MS), ion chromatography (IC), liquid chromatography (LC), nuclear magnetic resonance spectroscopy (NMR), etc.

It should be noted that when testing the non-aqueous electrolyte of the present application, the freshly prepared non-aqueous electrolyte can be taken directly, or the non-aqueous electrolyte can be obtained from the secondary battery. An exemplary method of obtaining non-aqueous electrolyte from a secondary battery includes the following steps: discharging the secondary battery to the discharge cut-off voltage (generally leaving the battery in a full discharge state for safety reasons) and then centrifuging it, after which an appropriate amount of the liquid obtained by centrifugation is the non-aqueous electrolyte. The non-aqueous electrolyte can also be obtained directly from the liquid injection port of the secondary battery.

Secondary Battery

A second aspect of the present application provides a secondary battery, the secondary battery comprising an electrode assembly, a non-aqueous electrolyte and an outer package, wherein the non-aqueous electrolyte is the non-aqueous electrolyte according to the first aspect of the present application, whereby the secondary battery of the present application can simultaneously have good cycle performance, storage performance, and kinetic performance.

The secondary battery of the present application may be a lithium secondary battery, and in particular may be a lithium-ion secondary battery.

The electrode assembly typically includes a positive electrode plate, a negative electrode plate and a separator, wherein the separator is provided between the positive electrode plate and the negative electrode plate, which mainly serves to prevent a short circuit between the positive electrode and the negative electrode, and at the same time allows lithium ions to pass through.

The secondary battery of the present application uses the non-aqueous electrolyte according to the first aspect of the present application, which helps to form a dense, stable, low impedance and high ionic conductivity interfacial film on the surface of both the positive active material and the negative active material, thereby balancing the charge transfer resistance of the positive and negative electrodes, reducing their differences, and improving the performance of the secondary battery.

In the secondary battery of the present application, the positive electrode has a charge transfer resistance of Rct1, the negative electrode has a charge transfer resistance of Rct2, and Rct1/Rct2 is from 0.5 to 2, optionally from 1.25 to 2, from 1.3 to 2, from 1.35 to 2, from 1.4 to 2, from 1.25 to 1.8, from 1.3 to 1.8, from 1.35 to 1.8, from 1.4 to 1.8, and from 1.4 to 1.8, from 1.25 to 1.6, from 1.3 to 1.6, from 1.35 to 1.6, or from 1.4 to 1.6. The resulting smaller difference in charge transfer resistance between the positive and negative electrodes allows for better performance of the secondary battery.

The charge transfer resistance of the positive electrode plate is obtained by the following method: assembling the positive electrode plate into a symmetrical cell, testing its electrochemical impedance spectrum by using EIS (Electrochemical impedance spectroscopy) via an electrochemical workstation, plotting a Nyquist diagram, analyzing the obtained Nyquist diagram by using the equivalent circuit curve fitting method, and taking the semicircle diameter as the charge transfer resistance of the positive electrode plate as Rct1. The test voltage may be 10 mV and the test frequency may be from 0.1 Hz to 100 K Hz. The positive electrode plate may be obtained by disassembling it from a secondary battery, and for safety reasons, the secondary battery is generally left in a fully discharged state.

The charge transfer resistance of the negative electrode plate is obtained by the following method: assembling the negative electrode plate into a symmetrical cell, testing its electrochemical impedance spectrum by using EIS (Electrochemical impedance spectroscopy) via an electrochemical workstation, plotting a Nyquist diagram, analyzing the obtained Nyquist diagram using the equivalent circuit curve fitting method, and taking the semicircle diameter as the charge transfer resistance of the negative electrode plate as Rct2. The test voltage may be 10 mV and the test frequency may be from 0.1 Hz to 100 K Hz. The negative electrode plate may be obtained by disassembling it from a secondary battery, which is generally left in a fully discharged state for safety reasons.

The non-aqueous electrolyte comprises a first electrolyte that infiltrates the electrode assembly and a second electrolyte disposed between the electrode assembly and the outer package. The first electrolyte is obtained by the following test method: disassembling the electrode assembly after discharging the secondary battery to the discharge cut-off voltage and centrifuging it, after which the liquid obtained by centrifugation is the first electrolyte. The second electrolyte is a free electrolyte, which can be obtained from the liquid injection port of the secondary battery.

The sum of the mass content of the first lithium salt, the second lithium salt, the third lithium salt, the first additive and the second additive in the first electrolyte is X1, based on the total mass of the first electrolyte, the sum of the mass content of the first lithium salt, the second lithium salt, the third lithium salt, the first additive and the second additive in the second electrolyte is X2, based on the total mass of said second electrolyte, and $0.5 \leq X1/X2 < 1$.

[Positive Electrode Plate]

In some embodiments, the positive electrode plate comprises a positive electrode collector fluid and a positive electrode film provided on at least one surface of the positive electrode collector, the positive electrode film comprising a positive active material. For example, the positive electrode collector has two surfaces opposite each other in the direction of its own thickness, and the positive electrode film is provided on either or both of the two opposite surfaces of the positive electrode collector.

The positive electrode film comprises a positive active material, and the positive active material known in the art for secondary batteries can be used. For example, the positive active material may comprise at least one of a lithium transition metal oxide, a lithium-containing phosphate of olivine structure, and respective modified compounds thereof. Examples of lithium transition metal oxides may include at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and their respective modified compounds. Examples of lithium phosphates containing olivine structures may include at least one of lithium iron phosphate, lithium iron phosphate composites with carbon, lithium manganese phosphate, lithium manganese phosphate composites with carbon, lithium manganese iron phosphate, lithium manganese iron phosphate composites with carbon, and their respective modified compounds. The present application is not limited to these materials, but may use other conventionally known materials that can be used as positive active materials for secondary batteries. These positive active materials may be used as alone or in combination of two or more.

In some embodiments, the positive active material comprises a layered material with a molecular formula of $Li_aNi_bCo_cMn_dAl_eM_fO_gA_h$, in which M represents a cation doped at transition metal site, A represents an anion doped at oxygen site, $0.8 \leq a \leq 1.2$, $0 \leq b \leq 1$, $0 \leq c \leq 1$, $0 \leq d \leq 1$, $0 \leq e \leq 1$, $0 \leq f \leq 0.2$ $0 \leq g \leq 2$, $0 \leq h \leq 2$, $b+c+d+e+f=1$, $g+h=2$.

The layered material with the molecular formula of $Li_aNi_bCo_cMn_dAl_eM_fO_gA_h$ can optionally be modified by M cation doping, modified by A anion doping or modified by both M cation and A anion doping, and the crystal structure of the layered material obtained after doping is more stable, which can further enhance the electrochemical performance of the secondary battery, such as cycle performance, kinetic performance, etc.

In some embodiments, M is selected from at least one of Si, Ti, Mo, V, Ge, Se, Zr, Nb, Ru, Pd, Sb, Ce, Te, and W.

In some embodiments, A is selected from at least one of F, N, P, and S. Optionally, A is selected from F. After modification by F doping, the crystal structure of $Li_aNi_bCo_cMn_dAl_eM_fO_gA_h$ is more stable, thereby enabling better cycle performance and kinetic performance of the secondary battery.

The values of a, b, c, d, e, f, g, and h satisfy the condition that $Li_aNi_bCo_cMn_dAl_eM_fO_gA_h$ remains electrically neutral.

In some embodiments, $0 < b < 0.98$. Optionally, $0.50 \leq b < 0.98$, $0.55 \leq b < 0.98$, $0.60 \leq b < 0.98$, $0.65 \leq b < 0.98$, $0.70 \leq b < 0.98$, $0.75 \leq b < 0.98$, or $0.80 \leq b < 0.98$.

In some embodiments, c=0.

In some embodiments, $0 < c \leq 0.20$. Optionally, $0 < c \leq 0.15$, $0 < c \leq 0.10$, $0 < c \leq 0.09$, $0 < c \leq 0.08$, $0 < c \leq 0.07$, $0 < c \leq 0.06$, $0 < c \leq 0.05$, $0 < c \leq 0.04$, $0 < c \leq 0.03$, $0 < c \leq 0.02$, or $0 < c \leq 0.01$.

Cobalt is less abundant in the earth's crust, difficult to mine and expensive, so low cobalt or no cobalt has become an inevitable development trend for positive active materials. However, cobalt contributes greatly to the lithium ion diffusion rate of positive active materials, and low cobalt or no cobalt will reduce the lithium ion diffusion rate of positive active materials and affect the cycle performance of secondary batteries. Researchers have been working to enhance the lithium ion diffusion rate of low-cobalt or cobalt-free positive active materials, but there is no good solution yet.

The inventors of the present application unexpectedly discovered in the course of their research that when the content A2 of the second lithium salt and the content A3 of the third lithium are reasonably adjusted and meet the A3/A2 of 0.04 to 30, a low-impedance interfacial film can be formed on the surface of the positive active material, and the B atoms in the structures of the second lithium salt and the third lithium salt can easily bind to the O atoms in the positive active material. This reduces the charge transfer resistance of the positive active material and the diffusion resistance of lithium ions in the bulk phase of the positive active material. Therefore, when the non-aqueous electrolyte contains suitable amounts of the second lithium salt and the third lithium salt, the low-cobalt or cobalt-free positive active material can have a significantly improved lithium ion diffusion rate, and the lithium ions in the bulk phase of the low-cobalt or cobalt-free positive active material can be replenished to the surface in a timely manner to prevent the surface of the low-cobalt or cobalt-free positive active material from over-dilithiation, thus stabilizing the crystal structure of the low-cobalt or cobalt-free positive active material. Since the crystal structure of the low-cobalt or cobalt-free positive active material is more stable, the probability of the occurrence of problems such as structural properties, chemical properties or electrochemical properties of the cathode active material becoming unstable due to excessive lithium removal from the surface of the low-cobalt or cobalt-free positive active material, for example, irreversible distortion and increase in lattice defects of the cathode active material, is greatly reduced.

In some embodiments, $d=0$ and $0<e<0.50$. Optionally, $d=0$ and $0<e\leq0.45$, $d=0$ and $0<e\leq0.40$, $d=0$ and $0<e\leq0.35$, $d=0$ and $0<e\leq0.30$, $d=0$ and $0<e\leq0.25$, $d=0$ and $0<e\leq0.20$, $d=0$ and $0<e\leq0.15$, or $d=0$ and $0<e\leq0.10$.

In some embodiments, $e=0$ and $0<d<0.50$. Optionally, $e=0$ and $0<d\leq0.45$, $e=0$ and $0<d\leq0.40$, $e=0$ and $0<d\leq0.35$, $e=0$ and $0<d\leq0.30$, $e=0$ and $0<d\leq0.25$, $e=0$ and $0<d\leq0.20$, $e=0$ and $0<d\leq0.15$, or $e=0$ and $0<d\leq0.10$.

In some embodiments, $0<d<0.50$ and $0<e<0.50$. Optionally, $0<d\leq0.30$ and $0<e\leq0.10$.

In some embodiments, $g=2$ and $h=0$.

In some embodiments, $g=0$ and $h=2$.

In some embodiments, $0<g<2$, $0<h<2$, and $g+h=2$.

As examples, layered materials with the molecular formula of $Li_aNi_bCo_cMn_dAl_eM_fO_gA_h$ include, but are not limited to, at least one of $LiNi_{0.8}Co_{0.1}Mn_{0.1}O_2$, $LiNi_{0.6}Co_{0.2}Mn_{0.2}O_2$ $LiNi_{0.5}Co_{0.2}Mn_{0.3}O_2$, $LiNi_{0.8}Co_{0.05}Mn_{0.15}O_2$, $LiNi_{0.7}Mn_{0.3}O_2$, $LiNi_{0.69}Co_{0.01}Mn_{0.3}O_2$, $LiNi_{0.68}Co_{0.02}Mn_{0.3}O_2$, $LiNi_{0.65}Co_{0.05}Mn_{0.3}O_2$, $LiNi_{0.63}Co_{0.07}Mn_{0.3}O_2$, $LiNi_{0.61}Co_{0.09}Mn_{0.3}O_2$.

$Li_aNi_bCo_cMn_dAl_eM_fO_gA_h$ can be prepared according to conventional methods in the art. Exemplary preparation methods are as follows: a lithium source, a nickel source, a cobalt source, a manganese source, an aluminum source, an M-element precursor, and an A-element precursor are mixed and sintered. The sintering atmosphere may be an oxygen-containing atmosphere, for example, an air atmosphere or an oxygen atmosphere. The $O_2$ concentration of the sintering atmosphere is, for example, from 70% to 100%. The sintering temperature and sintering time can be adjusted according to the actual situation.

As an example, the lithium source includes, but is not limited to, at least one of lithium oxide ($Li_2O$), lithium phosphate ($Li_3PO_4$), lithium dihydrogen phosphate ($LiH_2PO_4$), lithium acetate ($CH_3COOLi$), lithium hydroxide ($LiOH$), lithium carbonate ($Li_2CO_3$), and lithium nitrate ($LiNO_3$). As an example, the nickel source includes, but is not limited to, at least one of nickel sulfate, nickel nitrate, nickel chloride, nickel oxalate, and nickel acetate. As an example, the cobalt source includes, but is not limited to, at least one of cobalt sulfate, cobalt nitrate, cobalt chloride, cobalt oxalate, and cobalt acetate. As an example, the manganese source includes, but is not limited to, at least one of manganese sulfate, manganese nitrate, manganese chloride, manganese oxalate, and manganese acetate. As an example, the aluminum source includes, but is not limited to, at least one of aluminum sulfate, aluminum nitrate, aluminum chloride, aluminum oxalate, and aluminum acetate. As an example, the element M precursor includes, but is not limited to, at least one of an oxide of the element M, a nitrate compound of the element M, a carbonate compound of the element M, a hydroxide compound of the element M, and an acetate compound of the element M. As an example, the precursors of element A include, but are not limited to, at least one of ammonium fluoride, lithium fluoride, hydrogen fluoride, ammonium chloride, lithium chloride, hydrogen chloride, ammonium nitrate, ammonium nitrite, ammonium carbonate, ammonium bicarbonate, ammonium phosphate, phosphoric acid, ammonium sulfate, ammonium bisulfate, ammonium bisulfite, ammonium sulfite, ammonium hydrogen sulfide, hydrogen sulfide, lithium sulfide, ammonium sulfide, and elemental sulfur.

In some embodiments, the mass content of the layered material with the molecular formula of $Li_aNi_bCo_cMn_dAl_eM_fO_gA_h$ is from 80% to 99%, based on the total mass of the positive electrode film. For example, the mass content of the layered material with the molecular formula of $Li_aNi_bCo_cMn_dAl_eM_fO_gA_h$ may be 80%, 81%, 82%, 83%, 84%, 85%, 86%, 87%, 88%, 89%, 90%, 91%, 92%, 93%, 94%, 95%, 96%, 97%, 98%, 99% or any of the above values the range consisting of Optionally, the layered material with the molecular formula of $Li_aNi_bCo_cMn_dAl_eM_fO_gA_h$ has a mass content of from 85% to 99%, from 90% to 99%, from 95% to 99%, from 80% to 98%, from 85% to 98%, from 90% to 98%, from 95% to 98%, from 80% to 97%, from 85% to 97%, from 90% to 97%, or from 95% to 97%.

In some embodiments, the positive electrode film may further optionally comprise a conductive agent for positive electrode. The present application does not particularly limit the type of conductive agent for positive electrode, and as an example, the conductive agent for positive electrode includes at least one of superconducting carbon, conductive graphite, acetylene black, carbon black, Cochin black, carbon dots, carbon nanotubes, graphene, and carbon nanofibers. In some embodiments, the mass content of the conductive agent for positive electrode is below 5%, based on the total mass of the positive electrode film.

In some embodiments, the positive electrode film further optionally comprises a binder for positive electrode. The present application does not particularly limit the type of the binder for positive electrode, and as an example, the binder for positive electrode may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, vinylidene fluoride-hexafluoropropylene copolymer, and fluorinated acrylate resins. In some embodiments, the mass content of the binder for positive electrode is below 5%, based on the total mass of the positive electrode film.

In some embodiments, the positive electrode collector may be a metal foil or a composite collector. As an example of a metal foil, an aluminum foil may be used. The composite collector may include a base layer of polymeric material and a layer of metallic material formed on at least one surface of the base layer of polymeric material. As an example, the metal material may be selected from at least one of aluminum, aluminum alloy, nickel, nickel alloy, titanium, titanium alloy, silver, and silver alloy. As an example, the polymeric material base layer may be selected from polypropylene (PP), polyethylene terephthalate (PET), polybutylene terephthalate (PBT), polystyrene (PS), polyethylene (PE), etc.

The positive electrode film is typically made by coating a positive electrode slurry onto a positive electrodecollector, drying, and cold pressing. The positive electrode slurry is typically formed by dispersing the positive active material, an optional conductive agent, an optional binder, and any other components in a solvent and stirring well. The solvent may be N-methylpyrrolidone (NMP), but is not limited thereto.

[Negative Electrode Plate]

In some embodiments, the negative electrode plate comprises a negative electrode collector and a negative electrode film disposed on at least one surface of the negative electrode collector, the negative electrode film comprising a negative active material. For example, the negative collector fluid has two surfaces opposite each other in the direction of its own thickness, and the negative electrode film r is provided on either or both of the two opposite surfaces of the negative electrode collector.

The negative active material may be a negative active material known in the art for secondary batteries. As an example, the negative active material includes, but is not limited to, at least one of natural graphite, artificial graphite, soft carbon, hard carbon, silicon-based material, tin-based material, and lithium titanate. The silicon-based material may include at least one of elemental silicon, silicon oxide, silicon-carbon composite, silicon-nitrogen composite, and silicon alloy material. The tin-based materials may include at least one of elemental tin, tin oxide, and tin alloy material. The present application is not limited to these materials, and other conventionally known materials that can be used as negative active materials for secondary batteries may also be used. These negative active materials may be used as just one alone or in combination of two or more.

In some embodiments, the negative electrode film may further optionally include a conductive agent for negative electrode. The present application does not particularly limit the type of the conductive agent for negative electrode and, as an example, the conductive agent for negative electrode may include at least one of superconducting carbon, conductive graphite, acetylene black, carbon black, Cochin black, carbon dots, carbon nanotubes, graphene, carbon nanofibers. In some embodiments, the mass content of the conductive agent negative electrode is below 5%, based on the total mass of the negative electrode film.

In some embodiments, the negative electrode film may further optionally comprise a binder for negative electrode. The present application does not particularly limit the type of the binder for negative electrode, and as an example, the binder for negative electrode may include at least one of styrene-butadiene rubber (SBR), water-soluble unsaturated resin SR-1B, aqueous acrylic resins (e.g., polyacrylic acid PAA, polymethacrylic acid PMAA, sodium polyacrylate PAAS), polyacrylamide (PAM), polyvinyl alcohol (PVA), sodium alginate (SA), and carboxymethyl chitosan (CMCS). In some embodiments, the mass content of the binder for negative electrode is below 5%, based on the total mass of the negative electrode film.

In some embodiments, the negative electrode film may optionally further include other additives. As examples, other additives may include thickeners, e.g., sodium carboxymethylcellulose (CMC-Na), PTC thermistor material, etc. In some embodiments, the mass content of the other additives is below 2%, based on the total mass of the negative electrode film.

In some embodiments, the negative electrode collector may be a metal foil or a composite collector. As an example of a metal foil, a copper foil may be used. The composite collector may include a polymeric material base layer and a layer of metallic material formed on at least one surface of the polymeric material base layer. As an example, the metal material may be selected from at least one of copper, copper alloy, nickel, nickel alloy, titanium, titanium alloy, silver, and silver alloy. As examples, the polymeric material base layer may be selected from polypropylene (PP), polyethylene terephthalate (PET), polybutylene terephthalate (PBT), polystyrene (PS), polyethylene (PE), etc.

The negative electrode film is usually formed by coating a negative electrode slurry on a negative electrode collector, drying and cold pressing. The negative electrode slurry is typically formed by dispersing the negative active material, optional conductive agent, optional binder, other optional additives in a solvent and stirring well. The solvent may be N-methylpyrrolidone (NMP) or deionized water, but is not limited thereto.

[Separator]

A separator is arranged between the positive electrode plate and the negative electrode plate, which mainly functions as preventing short circuit of the positive and negative electrodes while allowing active ions to pass through. There is no particular limitation on the type of separator in the present application, and any well-known porous-structure separator with good chemical stability and mechanical stability can be selected.

In some embodiments, materials of the separator can be one or more selected from glass fibers, non-woven fabrics, polyethylene, polypropylene and polyvinylidene fluoride. The separator can be a single-layer film or a multi-layer composite film. When the separator is a multi-layer composite film, materials of each layer can be the same or different.

In some embodiments, the positive electrode plate, the negative electrode plate, and the separator can be made into an electrode assembly by a winding process or a stacking process.

In some embodiments, the secondary battery may include an outer package. The outer package may be used to package the electrode assembly and an electrolyte.

In some embodiments, the outer package of the secondary battery may be a hard case, such as a hard plastic case, an aluminum case, a steel case, and the like. The outer package of the secondary battery may also be a soft package, such as a pouch-type soft package. Material of the soft package can be plastic, such as one or more of polypropylene (PP), polybutylene terephthalate (PBT), and polybutylene succinate (PBS).

The present application does not have particular limitation to the shape of the secondary battery. The secondary battery may be cylindrical, square, or in other arbitrary shape. FIG. 1 shows a secondary battery 5 with a square structure as an example.

Figure 2:
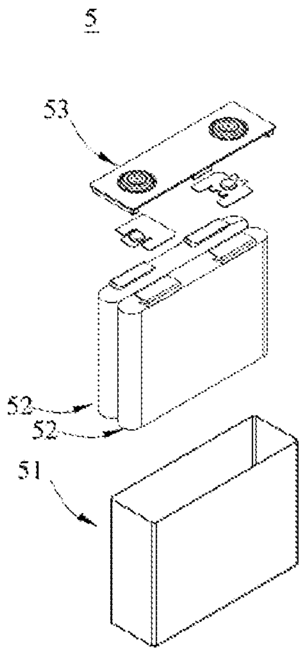
FIG. 2 is an exploded view of a secondary battery according to an embodiment of the present application.

In some embodiments, referring to FIG. 2, the outer package may include a housing 51 and a cover plate 53. The housing 51 may include a bottom plate and side plates connected to the bottom plate, and the bottom plate and the side plates enclose a receiving cavity. The housing 51 has an opening communicated with the receiving cavity, and the cover plate 53 can cover the opening to close the receiving cavity. The positive electrode plate, the negative electrode plate and the separator may be wound or laminated to form an electrode assembly 52, which is encapsulated in the receiving cavity. A non-aqueous electrolyte is infiltrated into the electrode assembly 52. The number of electrode assemblies 52 contained in the secondary battery 5 may be one or more, which may be adjusted according to the demand.

The method for preparing the secondary battery of the present application is well known. In some embodiments, a positive electrode plate, a separator, a negative electrode plate, and a non-aqueous electrolyte may be assembled to form a secondary battery. As an example, the positive electrode plate, the separator, and the negative electrode plate can be formed into an electrode assembly by a winding process or a laminating process; the battery assembly is placed in an outer package, into which the non-aqueous electrolyte is injected after it is dried. After that, the processes of vacuum packing, steady standing, formation, and shaping are carried out, thereby obtaining a secondary battery. In some embodiments, the method for preparing the secondary battery further comprises a secondary injection process performed after the formation process, and the content of the first lithium salt, the second lithium salt, the third lithium salt, the first additive and the second additive during the second injection of the non-aqueous electrolyte is lower than that of the first injection of the non-aqueous electrolyte. By adding the secondary injection process, it helps to reduce the cost, while being able to improve the performance of the secondary battery. This is due to the fact that some of the components of the auxiliary lithium salts and additives are less stable on their own and tend to reduce the stability of the non-aqueous electrolyte when only a primary injection process is used, while the secondary battery of the present application uses a secondary injection process and the second injection of the non-aqueous electrolyte contains less auxiliary lithium salts and additives, thereby increasing the stability of the non-aqueous electrolyte. In some embodiments, the injection factor of the secondary battery is from 2.0 g/Ah to 5.0 g/Ah, and the mass of the non-aqueous electrolyte is the sum of the mass of the first injected non-aqueous electrolyte and the second injected non-aqueous electrolyte.

In some embodiments of the present application, the secondary battery according to the present application can be assembled into battery modules, and the number of secondary battery contained in the battery modules can be multiple, and the specific number can be adjusted according to the application and capacity of the battery modules.

Figure 3:
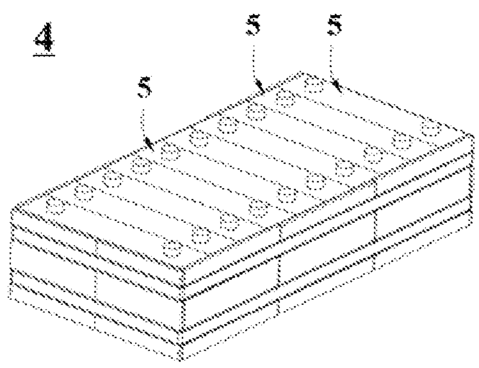
FIG. 3 is a schematic diagram of a battery module according to an embodiment of the present application.

FIG. 3 is a schematic diagram of a battery module 4 as an example. As shown in FIG. 3, in the battery module 4, the plurality of secondary batteries 5 may be provided sequentially along the length of the battery module 4. Of course, they can also be arranged in any other way. Further the plurality of secondary batteries 5 can be secured by fasteners.

Optionally, the battery module 4 may further include a housing with a receiving space, and the plurality of secondary batteries 5 are received in the receiving space.

In some embodiments, the above-mentioned battery module may also be assembled into a battery pack, and the number of battery modules included in the battery pack may be adjusted according to the application and capacity of the battery pack.

Figure 4:
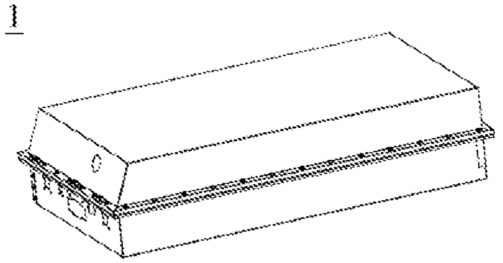
FIG. 4 is a schematic diagram of a battery pack according to an embodiment of the present application.
Figure 5:
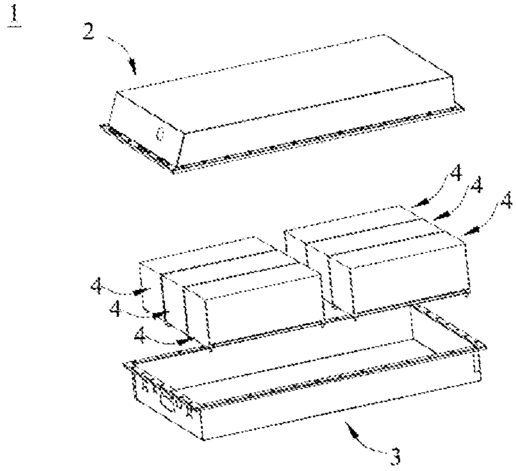
FIG. 5 is an exploded view of the battery pack according to an embodiment of the present application as shown in FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case body 2 and a lower case body 3. The upper case body 2 may cover the lower case body 3 to form a closed space for receiving the battery modules 4. The plurality of battery modules 4 may be arranged in the battery case in any manner.

Electrical Device

Embodiments of the present application also provide an electrical device comprising at least one of the secondary battery, battery module, and battery pack of the present application. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select a secondary battery, a battery module or a battery pack according to its usage requirements.

Figure 6:
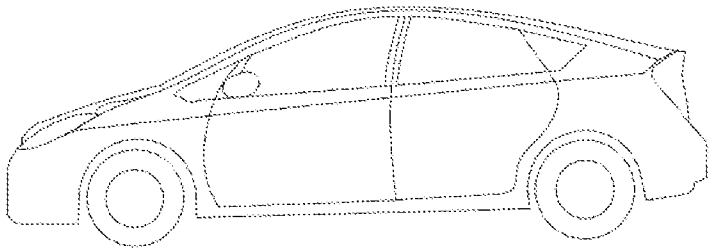
FIG. 6 is a schematic diagram of an electrical device according to an embodiment of the present application using the secondary battery of the present application as power.

FIG. 6 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, and the like. The electric device is generally required to be light and thin, and a secondary battery can be used as a power source.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

The secondary batteries of Examples 1 to 51 and Comparative Examples 1 to 10 were prepared according to the following method.

Preparation of Positive Electrode Plate

The Positive Active Material $LiNi_{0.6}Co_{0.2}Mn_{0.2}O_2$, the Conductive Agent Carbon Black, and the binder polyvinylidene fluoride (PVDF) were mixed in an appropriate amount of solvent NMP with thorough stirring at a weight ratio of 97.5:1.4:1 to form a uniform positive electrode slurry; the positive electrode slurry was uniformly applied on the surface of the positive electrode collector aluminum foil, and after drying and cold pressing, the positive electrode plate was obtained.

Preparation of Negative Electrode Plate

The negative active material graphite, the binder butadiene rubber (SBR), the thickener sodium carboxymethyl cellulose (CMC-Na), and the conductive agent carbon black (Super P) were mixed in an appropriate amount of deionized water as solvent with thorough stirring at a weight ratio of 96.2:1.8:1.2:0.8 to form a uniform negative electrode slurry; the negative electrode slurry was evenly applied on the surface of the negative electrode collector copper foil. After drying and cold pressing, the negative electrode plate was obtained.

Separator

A porous polyethylene film was used as the separator.

Preparation of Non-Aqueous Electrolyte

The lithium salts and additives were added to a non-aqueous solvent and mixed well to obtain a non-aqueous electrolyte. The composition of each component and the content thereof were shown in Table 1 and Table 3, respectively. In Table 1 and Table 3, the contents of the first lithium salt, the second lithium salt, the third lithium salt, the fourth lithium salt, the fifth lithium salt, the first additive and the second additive were based on the total mass of the non-aqueous electrolyte, and the contents of the first solvent, the second solvent and the third solvent were based on the total mass of the non-aqueous solvent, and "/" indicated that the corresponding component was not added.

Preparation of Secondary Battery

The positive electrode plate, the separator, the negative electrode plate as prepared above were stacked and wound in order to obtain an electrode assembly; the electrode assembly was put into an outer package, to which above-mentioned electrolyte was added. Through encapsulation, standing, formation, and aging process, the secondary battery was obtained.

Test Section (1) Test for Cycle Performance of Secondary Battery at Room Temperature At 25° C., the secondary battery was charged to 4.3V with a constant current of 1 C, continued to charge at constant voltage until the current was 0.05 C. At this time, the secondary battery was in a fully charged state, which charge capacity was recorded, i.e. the charge capacity of the first cycle. After the secondary battery was allowed for standing for 5 min, it was discharged to 2.8V with a constant current of 0.5 C. This was a cyclic charge-discharge process, which discharge capacity was recorded, i.e. the discharge capacity of the first cycle. The secondary battery was subjected to the above cyclic charge-discharge process, and the discharge capacity after each cycle was recorded. Capacity retention rate of secondary battery at 25° C. after 600 cycles (%)=discharge capacity after 600 cycles/discharge capacity after the $1^{st}$ cycle×100%.

(2) Test for Cycle Performance of Secondary Battery at High Temperature

At 45° C., the secondary battery was charged to 4.3V with a constant current of 1 C, continued to charge at constant voltage until the current was 0.05 C. At this time, the secondary battery was in a fully charged state, which charge capacity was recorded, i.e. the charge capacity of the first cycle. After the secondary battery was allowed for standing for 5 min, it was discharged to 2.8V with a constant current of 0.5 C. This was a cyclic charge-discharge process, which discharge capacity was recorded, i.e. the discharge capacity of the first cycle. The secondary battery was subjected to the above cyclic charge-discharge process, and the discharge capacity after each cycle was recorded. Capacity retention rate of secondary battery at 45° C. after 600 cycles (%)=discharge capacity after 600 cycles/discharge capacity after the $1^{st}$ cycle×100%.

(3) Test for Storage Performance of Secondary Battery at High Temperature

At 60° C., the secondary battery was charged to 4.3V with a constant current of 1 C, and continued to charge at constant voltage until the current was 0.05 C, at which time the volume of the secondary battery was tested by the drainage method and recorded as $V_0$. The secondary battery was placed in a thermostat at 60° C. and stored for 30 days and then removed, at which time the volume of the secondary battery was tested by the drainage method and recorded as $V_1$. The volume expansion rate of the secondary battery after 30 days of storage at 60° C. (%)=$[(V_1-V_0)/V_0]\times100\%$.

(4) Test for Initial DC Internal Resistance of Secondary Battery

At 25° C., the secondary battery was charged to 4.3V with a constant current of 1 C, and continued to charge with constant voltage until the current was 0.05 C, at which time the secondary battery was fully charged; the secondary battery was discharged with a constant current of 0.5 C and the secondary battery was adjusted to 50% SOC, at which time the voltage of the secondary battery was recorded as $U_1$; the secondary battery was discharged with a constant current $I_1$ of 4 C for 30 seconds, and 0.1 second picking point was used. The initial DC internal resistance of the secondary battery was expressed by using the discharge DC internal resistance of the secondary battery at 50% SOC, as the initial DC internal resistance (mΩ)=$(U_1-U_2)/I_1$.

(5) Test for Charge Transfer Resistance of Positive Electrode Plate

After disassembling the positive electrode plate from the secondary battery prepared above, the positive electrode plate was assembled into a symmetric cell and injected with the above-mentioned non-aqueous electrolyte, and then tested by using EIS via the Solartron 1470E CellTest multi-channel electrochemical workstation to draw a Nyquist diagram; the Zview software was used to analyze the obtained Nyquist diagram by using the equivalent circuit curve fitting method, with the semicircle diameter as the charge transfer resistance of the positive electrode plate as Rct1. The test voltage was 10 mV and the test frequency was from 0.1 Hz to 100 K Hz.

(6) Charge Transfer Resistance Test of the Negative Electrode Plate

After disassembling the negative electrode plate from the secondary battery prepared above, the negative electrode plate was assembled into a symmetric cell and injected with the above-mentioned non-aqueous electrolyte, and then tested by using EIS via the Solartron 1470E CellTest multi-channel electrochemical workstation to draw a Nyquist diagram; the Zview software was used to analyze the obtained Nyquist diagram by using the equivalent circuit curve fitting method, with the semicircle diameter as the charge transfer resistance of the negative electrode plate as Rct2. The test voltage was 10 mV and the test frequency was from 0.1 Hz to 100 K Hz.

To ensure the reliability of the test results, each of the above tests can be performed using at least three parallel samples and averaged as the test results.

Table 1 shown the preparation parameters for the non-aqueous electrolyte of Examples 1 to 35 and Comparative Examples 1 to 10, and Table 2 shown the test results obtained for Examples 1 to 35 and Comparative Examples 1 to 10 according to the performance test described above.

Table 3 shown the preparation parameters for the non-aqueous electrolyte of Examples 36 to 51, and Table 4 shown the test results obtained for Examples 36 to 51 according to the performance test described above.

TABLE 1

| | First lithium salt | | Second lithium salt | | Third lithium salt | | Fourth lithium salt | | Fifth lithium salt | |
|---|---|---|---|---|---|---|---|---|---|---|
| No. | Type | Content A1(%) | Type | Content A2(%) | Type | Content A3(%) | Type | Content A4(%) | Type | Content A5(%) |
| Example 1 | H1 | 0.05 | H10 | 0.005 | $LiBF_4$ | 0.2 | $LiPF_6$ | 6 | LiFSI | 10 |
| Example 2 | H1 | 0.05 | H10 | 0.01 | $LiBF_4$ | 0.2 | $LiPF_6$ | 6 | LiFSI | 10 |
| Example 3 | H1 | 0.05 | H10 | 0.02 | $LiBF_4$ | 0.2 | $LiPF_6$ | 6 | LiFSI | 10 |
| Example 4 | H1 | 0.05 | H10 | 0.05 | $LiBF_4$ | 0.2 | $LiPF_6$ | 6 | LiFSI | 10 |
| Example 5 | H1 | 0.05 | H10 | 0.1 | $LiBF_4$ | 0.2 | $LiPF_6$ | 6 | LiFSI | 10 |
| Example 6 | H1 | 0.05 | H10 | 0.2 | $LiBF_4$ | 0.2 | $LiPF_6$ | 6 | LiFSI | 10 |
| Example 7 | H1 | 0.05 | H10 | 0.3 | $LiBF_4$ | 0.2 | $LiPF_6$ | 6 | LiFSI | 10 |
| Example 8 | H1 | 0.005 | H10 | 0.03 | $LiBF_4$ | 0.1 | $LiPF_6$ | 6 | LiFSI | 10 |
| Example 9 | H1 | 0.01 | H10 | 0.03 | $LiBF_4$ | 0.1 | $LiPF_6$ | 6 | LiFSI | 10 |
| Example 10 | H1 | 0.02 | H10 | 0.03 | $LiBF_4$ | 0.1 | $LiPF_6$ | 6 | LiFSI | 10 |
| Example 11 | H1 | 0.05 | H10 | 0.03 | $LiBF_4$ | 0.1 | $LiPF_6$ | 6 | LiFSI | 10 |
| Example 12 | H1 | 0.1 | H10 | 0.03 | $LiBF_4$ | 0.1 | $LiPF_6$ | 6 | LiFSI | 10 |
| Example 13 | H1 | 0.2 | H10 | 0.03 | $LiBF_4$ | 0.1 | $LiPF_6$ | 6 | LiFSI | 10 |
| Example 14 | H1 | 0.08 | H10 | 0.04 | $LiBF_4$ | 0.01 | $LiPF_6$ | 6 | LiFSI | 10 |
| Example 15 | H1 | 0.08 | H10 | 0.04 | $LiBF_4$ | 0.02 | $LiPF_6$ | 6 | LiFSI | 10 |
| Example 16 | H1 | 0.08 | H10 | 0.04 | $LiBF_4$ | 0.05 | $LiPF_6$ | 6 | LiFSI | 10 |
| Example 17 | H1 | 0.08 | H10 | 0.04 | $LiBF_4$ | 0.1 | $LiPF_6$ | 6 | LiFSI | 10 |
| Example 18 | H1 | 0.08 | H10 | 0.04 | $LiBF_4$ | 0.2 | $LiPF_6$ | 6 | LiFSI | 10 |
| Example 19 | H1 | 0.08 | H10 | 0.04 | $LiBF_4$ | 0.5 | $LiPF_6$ | 6 | LiFSI | 10 |
| Example 20 | H1 | 0.005 | H10 | 0.3 | $LiBF_4$ | 0.2 | $LiPF_6$ | 6 | LiFSI | 10 |
| Example 21 | H1 | 0.2 | H10 | 0.005 | $LiBF_4$ | 0.2 | $LiPF_6$ | 6 | LiFSI | 10 |
| Example 22 | H1 | 0.2 | H10 | 0.005 | $LiBF_4$ | 0.01 | $LiPF_6$ | 6 | LiFSI | 10 |
| Example 23 | H1 | 0.1 | H10 | 0.005 | $LiBF_4$ | 0.01 | $LiPF_6$ | 6 | LiFSI | 10 |
| Example 24 | H1 | 0.1 | H10 | 0.01 | $LiBF_4$ | 0.02 | $LiPF_6$ | 6 | LiFSI | 10 |
| Example 25 | H1 | 0.05 | H10 | 0.05 | $LiBF_4$ | 0.2 | $LiPF_6$ | 6 | LiFSI | 10 |
| Example 26 | H1 | 0.05 | H10 | 0.05 | $LiBF_4$ | 0.2 | $LiPF_6$ | 6 | LiFSI | 10 |
| Example 27 | H1 | 0.05 | H10 | 0.05 | $LiBF_4$ | 0.2 | $LiPF_6$ | 6 | LiFSI | 10 |
| Example 28 | H1 | 0.05 | H10 | 0.05 | $LiBF_4$ | 0.2 | $LiPF_6$ | 6 | LiFSI | 10 |
| Example 29 | H1 | 0.05 | H10 | 0.05 | $LiBF_4$ | 0.2 | $LiPF_6$ | 6 | LiFSI | 10 |
| Example 30 | H1 | 0.05 | H10 | 0.05 | $LiBF_4$ | 0.2 | $LiPF_6$ | 6 | LiFSI | 10 |
| Example 31 | H2 | 0.05 | H10 | 0.05 | $LiBF_4$ | 0.2 | $LiPF_6$ | 6 | LiFSI | 10 |
| Example 32 | H3 | 0.05 | H10 | 0.05 | $LiBF_4$ | 0.2 | $LiPF_6$ | 6 | LiFSI | 10 |

TABLE 1-continued

| | | | | | | | | | | |
|---|---|---|---|---|---|---|---|---|---|---|
| Example 33 | H1 | 0.05 | H11 | 0.05 | $LiBF_4$ | 0.2 | $LiPF_6$ | 6 | LiFSI | 10 |
| Example 34 | H1 | 0.05 | H12 | 0.05 | $LiBF_4$ | 0.2 | $LiPF_6$ | 6 | LiFSI | 10 |
| Example 35 | H1 | 0.05 | H13 | 0.05 | $LiBF_4$ | 0.2 | $LiPF_6$ | 6 | LiFSI | 10 |
| Comparative Example 1 | / | / | / | / | / | / | $LiPF_6$ | 16 | / | / |
| Comparative Example 2 | / | / | / | / | / | / | / | / | LiFSI | 16 |
| Comparative Example 3 | / | / | / | / | / | / | $LiPF_6$ | 6 | LiFSI | 10 |
| Comparative Example 4 | H1 | 0.05 | / | / | / | / | $LiPF_6$ | 6 | LiFSI | 10 |
| Comparative Example 5 | / | / | H10 | 0.05 | / | / | $LiPF_6$ | 6 | LiFSI | 10 |
| Comparative Example 6 | / | / | / | / | $LiBF_4$ | 0.2 | $LiPF_6$ | 6 | LiFSI | 10 |
| Comparative Example 7 | H1 | 0.05 | H10 | 0.05 | / | / | $LiPF_6$ | 6 | LiFSI | 10 |
| Comparative Example 8 | / | / | H10 | 0.05 | $LiBF_4$ | 0.2 | $LiPF_6$ | 6 | LiFSI | 10 |
| Comparative Example 9 | H1 | 0.05 | / | / | $LiBF_4$ | 0.2 | $LiPF_6$ | 6 | LiFSI | 10 |
| Comparative Example 10 | H1 | 0.05 | LiBOB | 0.05 | $LiBF_4$ | 0.2 | $LiPF_6$ | 6 | LiFSI | 10 |

| | First solvent | | Second solvent | | Third solvent | |
|---|---|---|---|---|---|---|
| No. | Type | Content B1(%) | Type | Content B2(%) | Type | Content B3(%) |
| Example 1 | EC | 20 | EMC | 75 | EA | 5 |
| Example 2 | EC | 20 | EMC | 75 | EA | 5 |
| Example 3 | EC | 20 | EMC | 75 | EA | 5 |
| Example 4 | EC | 20 | EMC | 75 | EA | 5 |
| Example 5 | EC | 20 | EMC | 75 | EA | 5 |
| Example 6 | EC | 20 | EMC | 75 | EA | 5 |
| Example 7 | EC | 20 | EMC | 75 | EA | 5 |
| Example 8 | EC | 20 | EMC | 75 | EA | 5 |
| Example 9 | EC | 20 | EMC | 75 | EA | 5 |
| Example 10 | EC | 20 | EMC | 75 | EA | 5 |
| Example 11 | EC | 20 | EMC | 75 | EA | 5 |
| Example 12 | EC | 20 | EMC | 75 | EA | 5 |
| Example 13 | EC | 20 | EMC | 75 | EA | 5 |

TABLE 1-continued

| | | | | | | |
|---|---|---|---|---|---|---|
| Example 14 | EC | 20 | EMC | 75 | EA | 5 |
| Example 15 | EC | 20 | EMC | 75 | EA | 5 |
| Example 16 | EC | 20 | EMC | 75 | EA | 5 |
| Example 17 | EC | 20 | EMC | 75 | EA | 5 |
| Example 18 | EC | 20 | EMC | 75 | EA | 5 |
| Example 19 | EC | 20 | EMC | 75 | EA | 5 |
| Example 20 | EC | 20 | EMC | 75 | EA | 5 |
| Example 21 | EC | 20 | EMC | 75 | EA | 5 |
| Example 22 | EC | 20 | EMC | 75 | EA | 5 |
| Example 23 | EC | 20 | EMC | 75 | EA | 5 |
| Example 24 | EC | 20 | EMC | 75 | EA | 5 |
| Example 25 | PC | 20 | EMC | 75 | EA | 5 |
| Example 26 | EC | 20 | DMC | 75 | EA | 5 |
| Example 27 | EC | 20 | DEC | 75 | EA | 5 |
| Example 28 | EC | 10 | EMC | 90 | / | / |
| Example 29 | EC | 20 | EMC | 80 | / | / |
| Example 30 | EC | 30 | EMC | 70 | / | / |
| Example 31 | EC | 20 | EMC | 75 | EA | 5 |
| Example 32 | EC | 20 | EMC | 75 | EA | 5 |
| Example 33 | EC | 20 | EMC | 75 | EA | 5 |
| Example 34 | EC | 20 | EMC | 75 | EA | 5 |
| Example 35 | EC | 20 | EMC | 75 | EA | 5 |
| Comparative Example 1 | EC | 20 | EMC | 75 | EA | 5 |
| Comparative Example 2 | EC | 20 | EMC | 75 | EA | 5 |
| Comparative Example 3 | EC | 20 | EMC | 75 | EA | 5 |
| Comparative Example 4 | EC | 20 | EMC | 75 | EA | 5 |
| Comparative Example 5 | EC | 20 | EMC | 75 | EA | 5 |
| Comparative Example 6 | EC | 20 | EMC | 75 | EA | 5 |
| Comparative Example 7 | EC | 20 | EMC | 75 | EA | 5 |
| Comparative Example 8 | EC | 20 | EMC | 75 | EA | 5 |
| Comparative Example 9 | EC | 20 | EMC | 75 | EA | 5 |

TABLE 1-continued

| | | | | | | |
|---|---|---|---|---|---|---|
| Comparative Example 10 | EC | 20 | EMC | 75 | EA | 5 |

TABLE 2

| No. | A1 + A2 + A3 | A1/A2 | A1/(A2 + A3) | A3/A2 | A4/A5 | (A4 + A5)/(A1 + A2 + A3) | B1/(B2 + B3) | Rct1 (mΩ) |
|---|---|---|---|---|---|---|---|---|
| Example 1 | 0.255 | 10.0 | 0.24 | 40.0 | 0.6 | 63 | 0.25 | 55.4 |
| Example 2 | 0.260 | 5.0 | 0.24 | 20.0 | 0.6 | 62 | 0.25 | 53.2 |
| Example 3 | 0.270 | 2.50 | 0.23 | 10.0 | 0.6 | 59 | 0.25 | 52.4 |
| Example 4 | 0.300 | 1.0 | 0.20 | 4.0 | 0.6 | 53 | 0.25 | 50.7 |
| Example 5 | 0.350 | 0.50 | 0.17 | 2.0 | 0.6 | 46 | 0.25 | 51.8 |
| Example 6 | 0.450 | 0.25 | 0.13 | 1.0 | 0.6 | 36 | 0.25 | 52.4 |
| Example 7 | 0.550 | 0.17 | 0.10 | 0.67 | 0.6 | 29 | 0.25 | 53.5 |
| Example 8 | 0.135 | 0.17 | 0.04 | 3.33 | 0.6 | 119 | 0.25 | 54.0 |
| Example 9 | 0.140 | 0.33 | 0.08 | 3.33 | 0.6 | 114 | 0.25 | 52.7 |
| Example 10 | 0.150 | 0.67 | 0.15 | 3.33 | 0.6 | 107 | 0.25 | 52.4 |
| Example 11 | 0.180 | 1.67 | 0.38 | 3.33 | 0.6 | 89 | 0.25 | 51.7 |
| Example 12 | 0.230 | 3.33 | 0.77 | 3.33 | 0.6 | 70 | 0.25 | 51.3 |
| Example 13 | 0.330 | 6.67 | 1.54 | 3.33 | 0.6 | 48 | 0.25 | 53.1 |
| Example 14 | 0.130 | 2.0 | 1.60 | 0.25 | 0.6 | 123 | 0.25 | 56.3 |
| Example 15 | 0.140 | 2.0 | 1.33 | 0.50 | 0.6 | 114 | 0.25 | 54.1 |
| Example 16 | 0.170 | 2.0 | 0.89 | 1.25 | 0.6 | 94 | 0.25 | 53.7 |
| Example 17 | 0.220 | 2.0 | 0.57 | 2.50 | 0.6 | 73 | 0.25 | 53.1 |
| Example 18 | 0.320 | 2.0 | 0.33 | 5.0 | 0.6 | 50 | 0.25 | 52.1 |
| Example 19 | 0.620 | 2.0 | 0.15 | 12.5 | 0.6 | 26 | 0.25 | 54.5 |
| Example 20 | 0.505 | 0.017 | 0.01 | 0.67 | 0.6 | 32 | 0.25 | 57.3 |
| Example 21 | 0.405 | 40.0 | 0.98 | 40.0 | 0.6 | 40 | 0.25 | 51.6 |
| Example 22 | 0.215 | 40.0 | 13.33 | 2.0 | 0.6 | 74 | 0.25 | 49.9 |
| Example 23 | 0.115 | 20.0 | 6.67 | 2.0 | 0.6 | 139 | 0.25 | 48.9 |
| Example 24 | 0.130 | 10.0 | 3.33 | 2.0 | 0.6 | 123 | 0.25 | 49.2 |
| Example 25 | 0.300 | 1.0 | 0.20 | 4.0 | 0.6 | 53 | 0.25 | 51.7 |
| Example 26 | 0.300 | 1.0 | 0.20 | 4.0 | 0.6 | 53 | 0.25 | 49.8 |
| Example 27 | 0.300 | 1.0 | 0.20 | 4.0 | 0.6 | 53 | 0.25 | 52.9 |
| Example 28 | 0.300 | 1.0 | 0.20 | 4.0 | 0.6 | 53 | 0.11 | 52.3 |
| Example 29 | 0.300 | 1.0 | 0.20 | 4.0 | 0.6 | 53 | 0.25 | 50.2 |
| Example 30 | 0.300 | 1.0 | 0.20 | 4.0 | 0.6 | 53 | 0.43 | 48.1 |
| Example 31 | 0.300 | 1.0 | 0.20 | 4.0 | 0.6 | 53 | 0.25 | 51.5 |
| Example 32 | 0.300 | 1.0 | 0.20 | 4.0 | 0.6 | 53 | 0.25 | 51.2 |

TABLE 2-continued

| | | | | | | | | |
|---|---|---|---|---|---|---|---|---|
| Example 33 | 0.300 | 1.0 | 0.20 | 4.0 | 0.6 | 53 | 0.25 | 49.9 |
| Example 34 | 0.300 | 1.0 | 0.20 | 4.0 | 0.6 | 53 | 0.25 | 50.7 |
| Example 35 | 0.300 | 1.0 | 0.20 | 4.0 | 0.6 | 53 | 0.25 | 50.1 |
| Comparative Example 1 | / | / | / | / | / | / | 0.25 | 75.1 |
| Comparative Example 2 | / | / | / | / | / | / | 0.25 | 70.5 |
| Comparative Example 3 | / | / | / | / | 0.6 | / | 0.25 | 72.1 |
| Comparative Example 4 | / | / | / | / | 0.6 | / | 0.25 | 62.4 |
| Comparative Example 5 | / | / | / | / | 0.6 | / | 0.25 | 62.1 |
| Comparative Example 6 | / | / | / | / | 0.6 | / | 0.25 | 65.6 |
| Comparative Example 7 | / | 1.00 | / | / | 0.6 | / | 0.25 | 57.2 |
| Comparative Example 8 | | / | / | 4.0 | 0.6 | / | 0.25 | 56.9 |
| Comparative Example 9 | / | / | / | / | 0.6 | / | 0.25 | 55.2 |
| Comparative Example 10 | 0.300 | 1.00 | 0.20 | 4.0 | 0.6 | 53 | 0.25 | 60.6 |

| No. | Rct2 (mΩ) | Rct1/Rct2 | Capacity retention rate of secondary battery at 25° C. after 600 cycles | Capacity retention rate of secondary battery at 45° C. after 600 cycles | Initial DC internal resistance (mΩ) | Volume expansion rate of the secondary battery after 30 days of storage at 60° C. |
|---|---|---|---|---|---|---|
| Example 1 | 40.3 | 1.37 | 91.5% | 87.1% | 21.3 | 11.3% |
| Example 2 | 39.4 | 1.35 | 92.1% | 87.7% | 21 | 11.0% |
| Example 3 | 37.5 | 1.40 | 92.8% | 88.2% | 20.4 | 10.7% |
| Example 4 | 35.6 | 1.42 | 93.7% | 89.3% | 20.1 | 10.3% |
| Example 5 | 36.5 | 1.42 | 93.1% | 88.7% | 20.5 | 10.7% |
| Example 6 | 37.1 | 1.41 | 92.3% | 87.6% | 21.3 | 11.1% |
| Example 7 | 38.8 | 1.38 | 91.3% | 86.7% | 22.4 | 11.8% |
| Example 8 | 39.1 | 1.38 | 88.7% | 85.5% | 22.7 | 13.5% |
| Example 9 | 37.9 | 1.39 | 91.0% | 86.6% | 21.9 | 12.2% |

TABLE 2-continued

| | | | | | | |
|---|---|---|---|---|---|---|
| Example 10 | 37.5 | 1.40 | 91.4% | 86.8% | 21.4 | 11.5% |
| Example 11 | 36.8 | 1.40 | 91.8% | 87.5% | 21.3 | 11.3% |
| Example 12 | 36.3 | 1.41 | 92.7% | 88.1% | 20.8 | 10.7% |
| Example 13 | 37.3 | 1.42 | 91.2% | 86.9% | 22.3 | 12.1% |
| Example 14 | 41.3 | 1.36 | 90.0% | 86.1% | 23 | 14.1% |
| Example 15 | 39.5 | 1.37 | 91.6% | 87.3% | 22 | 12.9% |
| Example 16 | 38.9 | 1.38 | 92.1% | 87.9% | 21.9 | 12.6% |
| Example 17 | 38.5 | 1.38 | 92.4% | 88.4% | 21.4 | 12.1% |
| Example 18 | 37.5 | 1.39 | 93.1% | 89.4% | 21.3 | 11.3% |
| Example 19 | 39.4 | 1.38 | 91.4% | 87.3% | 22 | 12.3% |
| Example 20 | 44.3 | 1.29 | 93.1% | 89.7% | 24.1 | 11.9% |
| Example 21 | 40.3 | 1.28 | 91.4% | 87.4% | 21.4 | 12.4% |
| Example 22 | 39.1 | 1.28 | 90.0% | 86.7% | 20 | 12.3% |
| Example 23 | 38.7 | 1.26 | 89.0% | 86.1% | 19.3 | 12.7% |
| Example 24 | 39.4 | 1.25 | 89.7% | 87.4% | 20.4 | 13.2% |
| Example 25 | 36.5 | 1.42 | 92.7% | 88.4% | 20.8 | 10.2% |
| Example 26 | 33.9 | 1.47 | 93.9% | 88.7% | 19.6 | 12.5% |
| Example 27 | 38.1 | 1.39 | 91.9% | 89.0% | 21.1 | 10.1% |
| Example 28 | 37.1 | 1.41 | 93.1% | 90.3% | 21.3 | 10.1% |
| Example 29 | 35.2 | 1.43 | 93.3% | 89.0% | 20.1 | 10.4% |
| Example 30 | 33.5 | 1.44 | 93.8% | 87.4% | 19.6 | 11.9% |
| Example 31 | 36.7 | 1.40 | 92.8% | 88.7% | 21.3 | 11.0% |
| Example 32 | 36.3 | 1.41 | 92.9% | 88.1% | 19.9 | 11.0% |
| Example 33 | 37.0 | 1.35 | 92.0% | 88.7% | 21 | 11.5% |
| Example 34 | 36.6 | 1.39 | 92.8% | 88.9% | 20.4 | 10.7% |
| Example 35 | 36.1 | 1.39 | 92.5% | 89.3% | 20.1 | 10.3% |
| Comparative Example 1 | 103.5 | 0.73 | 78.3% | 68.8% | 30.3 | 20.5% |
| Comparative Example 2 | 88.7 | 0.79 | 79.5% | 69.5% | 27.9 | 25.3% |
| Comparative Example 3 | 81.9 | 0.88 | 79.1% | 70.9% | 28.1 | 21.6% |
| Comparative Example 4 | 71.5 | 0.87 | 80.4% | 72.4% | 28.3 | 19.9% |
| Comparative Example 5 | 70.8 | 0.88 | 82.5% | 73.5% | 27.1 | 18.7% |
| Comparative Example 6 | 74.5 | 0.88 | 81.5% | 72.6% | 26.3 | 19.3% |
| Comparative Example 7 | 64.1 | 0.89 | 82.5% | 74.9% | 26.1 | 16.1% |

TABLE 2-continued

| | | | | | | |
|---|---|---|---|---|---|---|
| Comparative Example 8 | 63.9 | 0.89 | 84.1% | 75.9% | 25.9 | 15.9% |
| Comparative Example 9 | 63.2 | 0.87 | 83.9% | 75.1% | 25.1 | 15.5% |
| Comparative Example 10 | 49.7 | 1.22 | 80.9% | 73.1% | 24.6 | 14.9% |

TABLE 3

| | First lithium salt | | Second lithium salt | | Third lithium salt | | Fourth lithium salt | | Fifth lithium salt | |
|---|---|---|---|---|---|---|---|---|---|---|
| No. | Type | Content A1(%) | Type | Content A2(%) | Type | Content A3(%) | Type | Content A4(%) | Type | Content A5(%) |
| Example 36 | H1 | 0.05 | H10 | 0.05 | $LiBF_4$ | 0.2 | $LiPF_6$ | 3 | LIFSI | 9.5 |
| Example 37 | H1 | 0.05 | H10 | 0.05 | $LiBF_4$ | 0.2 | / | / | LIFSI | 12.5 |
| Example 38 | H1 | 0.05 | H10 | 0.05 | $LiBF_4$ | 0.2 | $LiPF_6$ | 1 | LIFSI | 11.5 |
| Example 39 | H1 | 0.05 | H10 | 0.05 | $LiBF_4$ | 0.2 | $LiPF_6$ | 3 | LIFSI | 9.5 |
| Example 40 | H1 | 0.05 | H10 | 0.05 | $LiBF_4$ | 0.2 | $LiPF_6$ | 5 | LIFSI | 7.5 |
| Example 41 | H1 | 0.05 | H10 | 0.05 | $LiBF_4$ | 0.2 | $LiPF_6$ | 7 | LIFSI | 5.5 |
| Example 42 | H1 | 0.05 | H10 | 0.05 | $LiBF_4$ | 0.2 | $LiPF_6$ | 9 | LIFSI | 3.5 |
| Example 43 | H1 | 0.05 | H10 | 0.05 | $LiBF_4$ | 0.2 | $LiPF_6$ | 12.5 | / | / |
| Example 44 | H1 | 0.05 | H10 | 0.05 | $LiBF_4$ | 0.2 | $LiPF_6$ | 3 | LIFSI | 9.5 |
| Example 45 | H1 | 0.05 | H10 | 0.05 | $LiBF_4$ | 0.2 | $LiPF_6$ | 3 | LIFSI | 9.5 |
| Example 46 | H1 | 0.05 | H10 | 0.05 | $LiBF_4$ | 0.2 | $LiPF_6$ | 3 | LIFSI | 9.5 |
| Example 47 | H1 | 0.05 | H10 | 0.05 | $LiBF_4$ | 0.2 | $LiPF_6$ | 3 | LIFSI | 9.5 |
| Example 48 | H1 | 0.05 | H10 | 0.05 | $LiBF_4$ | 0.2 | $LiPF_6$ | 3 | LIFSI | 9.5 |
| Example 49 | H1 | 0.05 | H10 | 0.05 | $LiBF_4$ | 0.2 | $LiPF_6$ | 3 | LIFSI | 9.5 |
| Example 50 | H1 | 0.05 | H10 | 0.05 | $LiBF_4$ | 0.2 | $LiPF_6$ | 3 | LIFSI | 9.5 |
| Example 51 | H1 | 0.05 | H10 | 0.05 | $LiBF_4$ | 0.2 | $LiPF_6$ | 3 | LIFSI | 9.5 |

| | First solvent | | Second solvent | | First additive | | Second additive | |
|---|---|---|---|---|---|---|---|---|
| No. | Type | Content B1(%) | Type | Content B2(%) | Type | Content C1(%) | Type | Content C2(%) |
| Example 36 | EC | 20 | EMC | 80 | / | / | / | / |
| Example 37 | EC | 20 | EMC | 80 | FEC | 1 | Sulfamic acid | 0.01 |
| Example 38 | EC | 20 | EMC | 80 | FEC | 1 | Sulfamic acid | 0.01 |
| Example 39 | EC | 20 | EMC | 80 | FEC | 1 | Sulfamic acid | 0.01 |
| Example 40 | EC | 20 | EMC | 80 | FEC | 1 | Sulfamic acid | 0.01 |
| Example 41 | EC | 20 | EMC | 80 | FEC | 1 | Sulfamic acid | 0.01 |
| Example 42 | EC | 20 | EMC | 80 | FEC | 1 | Sulfamic acid | 0.01 |
| Example 43 | EC | 20 | EMC | 80 | FEC | 1 | Sulfamic acid | 0.01 |

TABLE 3-continued

| | | | | | | | | |
|---|---|---|---|---|---|---|---|---|
| Example 44 | EC | 20 | EMC | 80 | FEC | 0.05 | Sulfamic acid | 0.01 |
| Example 45 | EC | 20 | EMC | 80 | FEC | 0.1 | Sulfamic acid | 0.01 |
| Example 46 | EC | 20 | EMC | 80 | FEC | 0.2 | Sulfamic acid | 0.01 |
| Example 47 | EC | 20 | EMC | 80 | FEC | 0.5 | Sulfamic acid | 0.01 |
| Example 48 | EC | 20 | EMC | 80 | FEC | 2 | Sulfamic acid | 0.01 |
| Example 49 | EC | 20 | EMC | 80 | VC | 0.5 | Sulfamic acid | 0.01 |
| Example 50 | EC | 20 | EMC | 80 | DTD | 0.5 | Sulfamic acid | 0.01 |
| Example 51 | EC | 20 | EMC | 80 | PS | 0.5 | Sulfamic acid | 0.01 |

TABLE 4

| No. | A4/A5 | (C1 + A5)/B1 | Rct1(mΩ) | Rct2(mΩ) | Rct1/Rct2 | Capacity retention rate of secondary battery at 25° C. after 600 cycles | Capacity retention rate of secondary battery at 45° C. after 600 cycles | Initial DC internal resistance (mΩ) | Volume expansion rate of the secondary battery after 30 days of storage at 60° C. |
|---|---|---|---|---|---|---|---|---|---|
| Example 36 | 0.32 | / | 46.0 | 30.6 | 1.50 | 87.8% | 85.6% | 18.0 | 11.0% |
| Example 37 | / | 0.68 | 49.8 | 33.4 | 1.49 | 88.7% | 85.3% | 18.3 | 14.3% |
| Example 38 | 0.09 | 0.63 | 50.1 | 34.1 | 1.47 | 89.3% | 86.7% | 19.3 | 13.2% |
| Example 39 | 0.32 | 0.53 | 50.3 | 34.6 | 1.45 | 90.7% | 88.3% | 20.1 | 12.1% |
| Example 40 | 0.67 | 0.43 | 50.9 | 35.1 | 1.45 | 91.1% | 89.3% | 20.3 | 11.9% |
| Example 41 | 1.27 | 0.33 | 51.3 | 35.7 | 1.44 | 91.5% | 90.3% | 20.4 | 11.6% |
| Example 42 | 2.57 | 0.23 | 52.2 | 36.1 | 1.45 | 91.1% | 89.3% | 20.9 | 12.1% |
| Example 43 | / | / | 53.1 | 37.7 | 1.41 | 90.8% | 88.3% | 21.3 | 11.9% |
| Example 44 | 0.32 | 0.48 | 46.1 | 30.8 | 1.50 | 88.3% | 85.9% | 18.1 | 11.0% |
| Example 45 | 0.32 | 0.48 | 47.7 | 31.9 | 1.50 | 89.1% | 87.1% | 18.7 | 11.3% |
| Example 46 | 0.32 | 0.49 | 48.7 | 32.7 | 1.49 | 89.5% | 87.7% | 19.3 | 11.6% |
| Example 47 | 0.32 | 0.50 | 49.3 | 33.5 | 1.47 | 89.9% | 88.1% | 19.9 | 11.7% |
| Example 48 | 0.32 | 0.58 | 52.5 | 36.1 | 1.45 | 91.3% | 87.4% | 22.3 | 14.1% |
| Example 49 | 0.32 | 0.50 | 51.5 | 36.1 | 1.43 | 90.1% | 88.1% | 21.3 | 12.5% |
| Example 50 | 0.32 | 0.50 | 51.7 | 36.7 | 1.41 | 89.3% | 87.3% | 21.4 | 12.9% |
| Example 51 | 0.32 | 0.50 | 51.5 | 37.3 | 1.38 | 88.9% | 86.2% | 21.1 | 10.8% |

Combining the test results of Examples 1 to 35, it can be seen that by using the first lithium salt, the second lithium salt, and the third lithium salt of the present application as auxiliary lithium salts in the non-aqueous electrolyte and controlling their total content below 1%, while the content A1 of the first lithium salt, the content A2 of the second lithium salt, and the content A3 of the third lithium salt satisfied A1/A2 of 0.016 to 40 and A1/(A2+A3) 0.006 to 13.5, the secondary battery can simultaneously have high capacity retention rate, low volume expansion, and low internal resistance.

In Comparative Examples 1 to 9, the non-aqueous electrolyte did not use the auxiliary lithium salt of the present application, or only part of the auxiliary lithium salt of the present application was used, thus the resulting secondary battery prepared had a lower capacity retention rate and higher volume expansion rate and internal resistance. In contrast, when LiBOB was used as the auxiliary lithium salt in Example 10, the volume expansion rate of the secondary battery was improved to a certain extent, but the capacity retention rate was still low and the internal resistance was still high.

The combined test results of Examples 36 to 51 shown that by employing the first additive and/or the second additive in the non-aqueous electrolyte, at least one of the cycle performance, storage performance, and kinetic performance of the secondary battery can be improved.

Combining the test results of Examples 37 to 43, it was known that when the non-aqueous electrolyte comprised both a fourth lithium salt and a fifth lithium salt, and that the mass ratio A4/A5 thereof was from 0.2 to 3, optionally from 0.5 to 1.5, it helped to further improve the overall performance of the secondary battery.

It should be noticed that, described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A non-aqueous electrolyte comprising an electrolyte salt, a non-aqueous solvent, and an additive comprising $H_3NO_3S$, wherein the electrolyte salt comprises:

a first lithium salt having a structure shown in Formula 1, in which $R_1$ represents a fluorine atom or a partially fluorinated or perfluorinated C1-C10 alkyl group, wherein the first lithium salt has a mass content of A1 in the non-aqueous electrolyte, based on a total mass of the non-aqueous electrolyte;

a second lithium salt having a structure shown in Formula 2, in which $R_2$ and $R_3$ independently represent at least one of a fluorine atom or a partially fluorinated or perfluorinated group selected from C1-C10 alkyl group, C2-C10 alkenyl group, C2-C10 alkynyl group of, C6-C8 aryl group, C1-C10 alkoxy group, C2-C10 alkenoxy group, C2-C10 alkynloxy group, and C6-C8 aryloxy group, and $R_2$ and $R_3$ are not both fluorine atoms, wherein the second lithium salt has a mass content of A2 in the non-aqueous electrolyte, based on the total mass of the non-aqueous electrolyte; and a third lithium salt, selected from lithium tetrafluoroborate, wherein the third lithium salt has a mass content of A3 in the non-aqueous electrolyte, based on the total mass of the non-aqueous electrolyte;

Formula 1

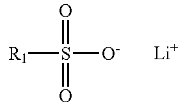

-continued

Formula 2

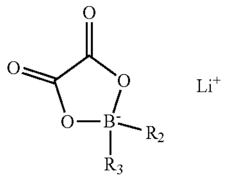

wherein the non-aqueous electrolyte satisfies that: A1+A2+A3 is below 1%, A1/A2 is from 0.016 to 40, and A1/(A2+A3) is from 0.006 to 13.5.

2. The non-aqueous electrolyte according to claim 1, wherein:

A1/A2 is from 0.03 to 10; and/or

A1/(A2+A3) is from 0.02 to 3.5.

3. The non-aqueous electrolyte according to claim 1, wherein the non-aqueous electrolyte further satisfies that: A3/A2 is from 0.04 to 30.

4. The non-aqueous electrolyte according to claim 1, wherein the non-aqueous electrolyte satisfies at least one of:

A1 is from 0.005% to 0.2%;

A2 is from 0.005% to 0.3%; and

A3 is from 0.01% to 0.5%.

5. The non-aqueous electrolyte according to claim 1, wherein the first lithium salt comprises at least one of following compounds:

H1

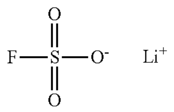

H2

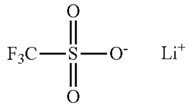

H3

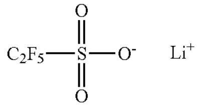

H4

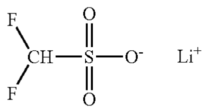

H5

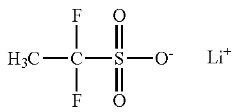

H6

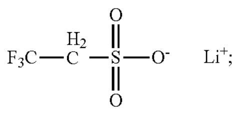

and/or the second lithium salt comprises at least one of following compounds:

H7

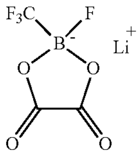

H8

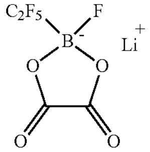

H9

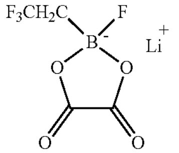

H11

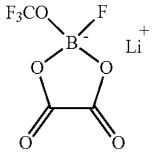

H12

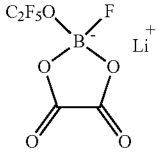

H13

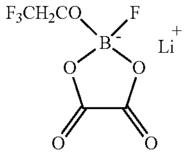

H14

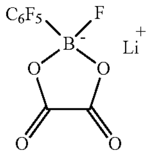

H15

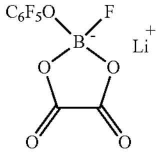

H16

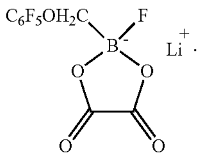

6. The non-aqueous electrolyte according to claim 1, wherein the electrolyte salt further comprises at least one of a fourth lithium salt and a fifth lithium salt;

wherein the fourth lithium salt is lithium hexafluorophosphate, and wherein the fourth lithium salt has a mass content of A4 in the non-aqueous electrolyte, based on the total mass of the non-aqueous electrolyte;

wherein the fifth lithium salt is lithium bis(fluorosulfonyl) imide, and wherein the fifth lithium salt has a mass content of A5 in the non-aqueous electrolyte, based on the total mass of the non-aqueous electrolyte; and wherein the non-aqueous electrolyte satisfies that: A4+A5 is from 10% to 20%.

7. The non-aqueous electrolyte according to claim 6, wherein (A4+A5)/(A1+A2+A3) is from 10 to 200.

8. The non-aqueous electrolyte according to claim 1, wherein:

the non-aqueous solvent comprises:

a first solvent comprising at least one of ethylene carbonate, propylene carbonate, and butylene carbonate, and having a mass content of B1 in the non-aqueous solvent, based on the total mass of the non-aqueous solvent;

a second solvent comprising at least one of methyl ethyl carbonate, diethyl carbonate, dimethyl carbonate, dipropyl carbonate, and having a mass content of B2 in the non-aqueous solvent, based on the total mass of the non-aqueous solvent; and a third solvent comprising at least one of methyl formate, methyl acetate, ethyl acetate, propyl acetate, methyl propionate, ethyl propionate, propyl propionate, methyl butyrate, and ethyl butyrate, and having a mass content of B3 in the non-aqueous solvent, based on the total mass of the non-aqueous solvent; and the non-aqueous electrolyte satisfies that: B1 is from 10% to 30%, B2 is from 50% to 90%, and B3 is from 0% to 20%.

9. The non-aqueous electrolyte according to claim 1, wherein the additive is a first additive, and the non-aqueous electrolyte further comprises a second additive comprising at least one of fluoroethylene carbonate, vinylene carbonate, ethylene sulfate, and 1,3-propanesultone, wherein the second additive has a mass content of C1 in the non-aqueous electrolyte, based on the total mass of the non-aqueous electrolyte, and wherein C1 is from 0.05% to 2%.

10. The non-aqueous electrolyte according to claim 1, wherein the additive has a mass content of C2 in the non-aqueous electrolyte, based on the total mass of the non-aqueous electrolyte, and wherein C2 is from 0.005% to 0.1%.

11. A secondary battery comprising:

an electrode assembly;

the non-aqueous electrolyte according to claim 1; and an outer packaging.

12. The secondary battery according to claim 11, wherein:

the electrode assembly comprises a positive electrode plate having a charge transfer resistance of Rct1 and a negative electrode plate having a charge transfer resistance of Rct2, wherein Rct1/Rct2 is from 0.5 to 2;

the charge transfer resistance of the positive electrode plate is obtained by following method: assembling the positive electrode plate into a symmetrical cell, testing an electrochemical impedance spectrum by using EIS via an electrochemical workstation, plotting a Nyquist diagram, analyzing the obtained Nyquist diagram using equivalent circuit curve fitting method, and taking a semicircle diameter as the charge transfer resistance Rct1 of the positive electrode plate;

the charge transfer resistance of the negative electrode plate is obtained by following method: assembling the negative electrode plate into a symmetrical cell, testing an electrochemical impedance spectrum by using EIS via an electrochemical workstation, plotting a Nyquist diagram, analyzing the obtained Nyquist diagram using equivalent circuit curve fitting method, and taking a semicircle diameter as the charge transfer resistance Rct2 of the negative electrode plate.

13. The secondary battery according to claim 11, wherein:

the non-aqueous electrolyte comprises a first electrolyte that infiltrates the electrode assembly and a second electrolyte located between the electrode assembly and the outer package;

a sum of mass contents of the first lithium salt, the second lithium salt, the third lithium salt, and the additive in the first electrolyte is X1, based on a total mass of the first electrolyte;

a sum of mass contents of the first lithium salt, the second lithium salt, the third lithium salt, and the additive in the second electrolyte is X2, based on a total mass of the second electrolyte;

$0.5 \leq X1/X2 < 1$; and the first electrolyte is obtained by following test method: disassembling the electrode assembly after discharging the secondary battery to a discharge cut-off voltage and performing centrifugation, the liquid obtained by centrifugation being the first electrolyte.

14. The secondary battery according to claim 11, wherein the positive electrode plate comprises a layered material with a molecular formula of $Li_aNi_bCo_cMn_dAl_eM_fO_gA_h$, in which M represents a cation doped at transition metal site, A represents an anion doped at oxygen site, $0.8 \leq a \leq 1.2$, $0 \leq b \leq 1$, $0 \leq c \leq 1$, $0 \leq d \leq 1$, $0 \leq e \leq 1$, $0 \leq f \leq 0.2$ $0 \leq g \leq 2$, $0 \leq h \leq 2$, $b+c+d+e+f=1$, and $g+h=2$.

15. The secondary battery according to claim 13, wherein $Li_aNi_bCo_cMn_dAl_eM_fO_gA_h$ satisfies at least one of:

M is selected from at least one of Si, Ti, Mo, V, Ge, Se, Zr, Nb, Ru, Pd, Sb, Ce, Te, and W;

A is selected from at least one of F, N, P, and S;

$0 < b < 0.98$;

$c=0$;

$0 < c \leq 0.20$;

$d=0$ and $0 < e < 0.50$;

$e=0$ and $0 < d < 0.50$; and $0 < d < 0.50$ and $0 < e < 0.50$.

16. A battery module comprising the secondary battery according to claim 10.

17. The non-aqueous electrolyte according to claim 9, wherein the non-aqueous electrolyte further satisfies that: $(C1+A5)/B1$ is from 0.3 to 0.8.

18. A non-aqueous electrolyte comprising an electrolyte salt and a non-aqueous solvent, wherein the electrolyte salt comprises:

a first lithium salt having a structure shown in Formula 1, in which $R_1$ represents a fluorine atom or a partially fluorinated or perfluorinated C1-C10 alkyl group, wherein the first lithium salt has a mass content of A1 in the non-aqueous electrolyte, based on a total mass of the non-aqueous electrolyte;

a second lithium salt comprising at least one of following compounds:

H7

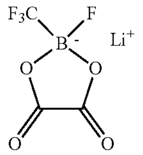

H8

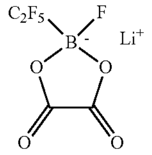

H9

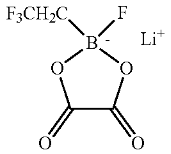

H11

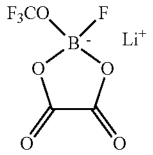

H12

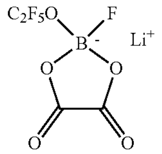

H13

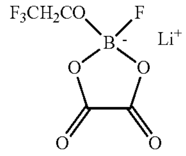

H14

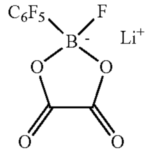

H15

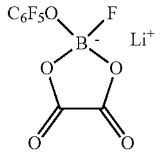

H16

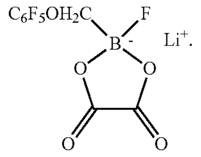

wherein the second lithium salt has a mass content of A2 in the non-aqueous electrolyte, based on the total mass of the non-aqueous electrolyte; and a third lithium salt, selected from lithium tetrafluoroborate, wherein the third lithium salt has a mass content of A3 in the non-aqueous electrolyte, based on the total mass of the non-aqueous electrolyte;

Formula 1

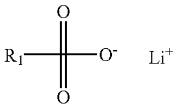

wherein the non-aqueous electrolyte satisfies that: A1+A2+A3 is below 1%, A1/A2 is from 0.016 to 40, and A1/(A2+A3) is from 0.006 to 13.5.

19. The non-aqueous electrolyte according to claim 1, wherein A1 is from 0.005% to 0.008%.

20. A non-aqueous electrolyte comprising an electrolyte salt, a non-aqueous solvent, and an additive comprising $H_3NO_3S$, wherein the electrolyte salt comprises:

a first lithium salt having a structure shown in Formula 1, in which $R_1$ represents a fluorine atom or a partially fluorinated or perfluorinated C1-C10 alkyl group, wherein the first lithium salt has a mass content of A1 in the non-aqueous electrolyte, based on a total mass of the non-aqueous electrolyte;

a second lithium salt having a structure shown in Formula 2, in which $R_2$ and $R_3$ independently represent at least one of a fluorine atom or a partially fluorinated or perfluorinated group selected from C1-C10 alkyl group, C2-C10 alkenyl group, C2-C10 alkynyl group of, C6-C8 aryl group, C1-C10 alkoxy group, C2-C10 alkenoxy group, C2-C10 alkynloxy group, and C6-C8 aryloxy group, wherein the second lithium salt has a mass content of A2 in the non-aqueous electrolyte, based on the total mass of the non-aqueous electrolyte; and a third lithium salt, selected from lithium tetrafluoroborate, wherein the third lithium salt has a mass content of A3 in the non-aqueous electrolyte, based on the total mass of the non-aqueous electrolyte;

Formula 1

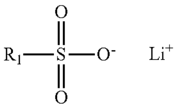

Formula 2

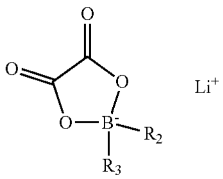

wherein the non-aqueous electrolyte satisfies that: A1 is from 0.005% to 0.008%, A1+A2+A3 is below 1%, A1/A2 is from 0.016 to 40, and A1/(A2+A3) is from 0.006 to 13.5.

* * * * *